United States Patent
Sedin et al.

(10) Patent No.: US 12,550,176 B2
(45) Date of Patent: Feb. 10, 2026

(54) LOW-LATENCY TRANSMISSION IN RESERVED TXOP

(71) Applicant: Telefonaktiebolaget LM Ericsson (publ), Stockholm (SE)

(72) Inventors: Jonas Sedin, Brentford (GB); Charlie Pettersson, Solna (SE); Rocco Di Taranto, Lund (SE); Dennis Sundman, Sollentuna (SE); Leif Wilhelmsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 18/023,845

(22) PCT Filed: Sep. 1, 2020

(86) PCT No.: PCT/EP2020/074356
§ 371 (c)(1),
(2) Date: Feb. 28, 2023

(87) PCT Pub. No.: WO2022/048731
PCT Pub. Date: Mar. 10, 2022

(65) Prior Publication Data
US 2023/0319866 A1    Oct. 5, 2023

(51) Int. Cl.
*H04W 72/00* (2023.01)
*H04W 72/1263* (2023.01)
*H04W 72/542* (2023.01)
*H04W 74/04* (2009.01)

(52) U.S. Cl.
CPC ..... *H04W 72/542* (2023.01); *H04W 72/1263* (2013.01); *H04W 74/04* (2013.01)

(58) Field of Classification Search
CPC .......... H04W 72/542; H04W 72/1263; H04W 74/04; H04W 84/12; H04W 74/0816; H04W 16/10
See application file for complete search history.

(56) References Cited

U.S. PATENT DOCUMENTS

2017/0230939 A1*  8/2017 Rudolf ............... H04W 4/70
2019/0320452 A1* 10/2019 Zhang ............. H04W 72/1268
2021/0392638 A1* 12/2021 Sun ................. H04W 72/23
(Continued)

FOREIGN PATENT DOCUMENTS

WO      2017027798 A1      2/2017

OTHER PUBLICATIONS

Georgios et al. (A Centralized MAC Protocol With QOS Support for Wireless LANS), Sep. 1, 2007.*
(Continued)

*Primary Examiner* — Lakeram Jangbahadur
(74) *Attorney, Agent, or Firm* — Murphy, Bilak & Homiller, PLLC

(57) ABSTRACT

A wireless device (AP1) contends for access to a medium. In response to gaining access to the medium, the wireless device (AP1) reserves a TXOP on the medium. Further, the wireless device (AP1) configures a set of resources (501, 502, 503) in the reserved TXOP to be available to at least one other wireless device (AP2, STA31) for one or more transmissions of data (D) arriving after beginning of the TXOP.

20 Claims, 15 Drawing Sheets

(56) References Cited

U.S. PATENT DOCUMENTS

2022/0159731 A1* 5/2022 Viger .................... H04W 72/23
2023/0042554 A1* 2/2023 Hedayat ............ H04W 72/0446

OTHER PUBLICATIONS

Lochan (Lochan Verma (Qualcomm): "Coordinated AP Time and Frequency Sharing in a Transmit Opportunity in 11be", IEEE Draft; 11-19-1582-00-00BE-Coordinated-AP-Time-and-Frequency-Sharing-in-a-Transmit-Opportunity-in-11BE), Nov. 11, 2019.*

802.11 Working Group of the LAN/, "IEEE P802.11ax™/D6.0", Draft Standard for Information technology—Telecommunications and information exchange between systems Local and metropolitan area networks—Specific requirements, Part 11: Wireless LAN Medium Access Control (MAC) and Physical Layer (PHY) Specifications, Nov. 2019, 1-780.

Jason, Yuchen Gua, et al., "Coordinated Spatial Reuse Operation", IEEE 802.11-20/0033r0, Dec. 31, 2019, 1-13.

Naik, Gaurang, et al., "Performance Analysis of Uplink Multi-User OFDMA in IEEE 802.11ax", 2018 IEEE International Conference on Communications (ICC), Kansas City, MO, USA, 2020, 1-6.

Orfanos, Georgios, et al., "A Centralized MAC Protocol with QOS Support for Wireless LANS", 18th Annual IEEE International Symposium on Personal, Indoor and Mobile Radio Communications (PIMRC), 2007, 1-6.

Sungjin Park, et al., "Coordinated Spatial Reuse Procedure", IEEE 802.11-20/0410r0, Mar. 2020, 1-20.

Unknown, Author, "Part 11: Wireless LAN Medium Access Control (MAC) and Physical Layer (PHY) Specifications", IEEE Std 802.11™-2016; IEEE Standard for Information technology—Telecommunications and Information exchange between systems Local and metropolitan area networks—Specific requirements, Dec. 14, 2016, 1-3534.

Verma, Lochan, et al., "Coordinated AP Time/Frequency Sharing in a Transmit Opportunity in 11be", doc.: IEEE 802.11-19/1582r1, Submission, Nov. 2019, 1-16.

Verma, Lochan, et al., "Coordinated AP Time/Frequency Sharing in a Transmit Opportunity in 11be", Qualcomm, et al., doc.: IEEE 802.11-19/1582r0, Nov. 2019, 12 pages.

* cited by examiner

LOW-LATENCY TRANSMISSION IN RESERVED TXOP

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has data to send. Effectively there is no difference in channel access whether the station is an access point (AP) or a non-access point (non-AP). DCF works well as long as the load is not too high. When the load is high, and in particular when the number of stations trying to access the channel is large, channel access based on DCF does not work well. The reason for this is that there will be a high probability of collision on the channel, leading to poor channel usage.

To improve the channel usage, and in particular to allow for better support of a large number of devices, a more centralized channel access may be utilized. Such centralized channel access may involve that rather than letting a STA access the channel whenever it has data to send, the channel access is controlled by the AP. A corresponding channel access scheme is for example supported in the IEEE 802.11ax technology, see IEEE P802.11ax™/D6.0 Draft Standard for Information technology—Tele-communications and information exchange between systems Local and metropolitan area networks-Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". The IEEE 802.11ax technology for example supports orthogonal frequency division multiple access (OFDMA) in both downlink (DL), i.e., in a direction from the AP to the STA, and uplink (UL), i.e., in a direction from the STA to the AP. Also multi-user transmission in form of multi-user multiple input multiple output (MU-MIMO) is supported for both the DL and the UL. By supporting MU transmission and letting the AP control the channel access within a cell, efficient channel usage is achieved and one can avoid collisions due to contention in the cell, in the IEEE 802.11 terminology also referred to as basic service set (BSS).

A default channel access mechanism used in current WLAN systems is referred to as enhanced distributed channel access (EDCA), as specified in IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012), vol., no., pp. 1-3534, 14 Dec. 2016, in the following denoted as "IEEE 802.11 PHY Specifications". In the EDCA channel access mechanism, the STA accesses the channel using a set of channel access parameters based on a traffic class of the data. The channel is obtained for a TXOP duration time, in which multiple frames of the same data class may be transmitted. The maximum size of a TXOP depends on the data type. A typical duration of a TXOP is in the range of a few milliseconds.

To improve the performance even further, coordination of channel usage between cells may be utilized. Here, one approach is to let a number of APs share a TXOP. For example, if there are two or more APs within range using the same channel, with no coordination each of them would contend for the channel and the AP that wins the contention would then reserve the channel using the TXOP concept. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs. Such features are also referred to as coordinated or cooperating APs (CAP).

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) proposes a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. The proposed mechanism consists of the three phases, as schematically illustrated in FIG. 1A. The first phase involves transmission of a TX indication frame and a request frame. In the first phase an AP that has gained a TXOP, also denoted as the TXOP owner, indicates to other APs that it is willing to share the TXOP (by means of the TX indication frame), and one or more neighboring APs indicate their intention to participate in sharing the resources (by the request frame). The TXOP owner may also be referred to as "Sharing AP", and the participating AP(s) may also be referred to as "Shared AP(s)". The first phase may also be referred to as initial coordination phase. In the second phase the TXOP owner informs the participating APs about their allocated resources and a TX start time, and the participating APs inform their client STAs about their respective resource allocations. In the third phase the participating APs transmit on their respective allocated resources in the TXOP, beginning at the TX start time.

FIG. 1B illustrates further details of the first phase, assuming a scenario with four APs, denoted as AP1, AP2, AP3, and AP4. In the example of FIG. 1B, the TXOP owner, i.e., AP1 first sends a CTI (CAP TXOP Indication) message, and the APs willing to participate in the sharing of the TXOP, i.e., AP2, AP3, and AP4, respond with a CTR (CAP TXOP Request) message. By means of the CTI message, AP1 notifies the other APs that it has obtained the TXOP and is willing to share it. By means of the CTR, AP2, AP3, and AP4 notify AP1 that they are willing to participate in the sharing of the TXOP.

FIG. 1C illustrates further details of the second phase, again assuming a scenario with four APs, denoted as AP1, AP2, AP3, and AP4. In the example of FIG. 1C, the TXOP owner, i.e., AP1, informs the participating APs, i.e., AP2, AP3, AP3, about their allocated resources and the TX start time. This is accomplished by sending a CTAS (CAP TXOP AP Schedule) message and the participating APs inform their associated STAs about their respectively allocated resources according to local scheduling within the BSS of the participating AP. This is accomplished by sending a CTLS (CAP TXOP Local Schedule) message.

The sharing of the TXOP during the transmission of data in the third phase can be based on multiplexing in the time domain, e.g., TDMA (Time Division Multiple Access), multiplexing in the frequency domain, e.g., OFDMA, or multiplexing in the spatial domain, e.g., using MU-MIMO (Multi-User Multiple Input/Multiple Output). FIG. 1D illustrates an example of sharing based on multiplexing in the time domain, and FIG. 1E shows an example of sharing in the frequency domain. Further, the sharing can be based on spatial reuse, i.e., rather than multiplexing the resources of the TXOP, the resources can be used simultaneously, sometimes in combination with transmit power control, e.g., as described in "Coordinated Spatial Reuse Operation", Internet document IEEE 802.11-20/0033r0 (URL: https://mentor.ieee.org/802.11/dcn/20/11-20-0033-00-00be-coordinated-spatial-reuse-operation.pptx, December 2019) or in "Coordinated Spatial Reuse Procedure", Internet document IEEE 802.11-20/0410r0 (URL: https://mentor.ieee.org/802.11/dcn/20/11-20-0410-00-00be-coordinated-spatial-reuse-procedure.pptx, March 2020).

However, in certain scenarios the existing TXOP sharing mechanisms might provide unsatisfactory results. For example, there may be scenarios where two or more BSSs coexist in the same space and one of the BSSs serves a first set of STAs with a first set of requirements and another of the BSSs might serve a second set of STAs with a second set of requirements, differing from the first set of requirements. Such scenarios may for example occur in factory environments. FIG. 2 shows an example of a corresponding scenario, where a first BSS, denoted as BSS1, serves a first set of STAs 21, and a second BSS, denoted as BSS2, serves a second set of STAs 22. Here, the first set of STAs 21 may for example include STAs that require very high throughput, but do not have very strict latency requirements. The second set of STAs 22 may in turn have much lower throughput requirements, but with stricter requirements on low latency. FIGS. 3A and 3B illustrate problems that may occur in such scenarios, assuming that BSS1 is served by a first AP denoted as AP1 and that BSS2 is served by a second AP denoted as AP2.

In the example of FIG. 3A, AP1 reserves a TXOP at t1. According to the IEEE 802.11 PHY Specifications, the length of the reserved TXOP can be up to 4.096 ms. During the reserved TXOP, at t2, data (D) arrives at AP2, e.g., is provided from higher layers to a PHY entity of AP2. At this point, AP2 needs to wait until the TXOP reserved by AP1 ends or until AP1 releases the TXOP, before AP2 can contend for channel access and itself attempt to reserve a TXOP. In the example of FIG. 3A, the reserved TXOP ends at t3, and AP2 then contends for the medium and reserves a TXOP at t4. Accordingly, AP2 can transmit the data that arrived at t2 only after t4. The associated latency, i.e., the difference t4−t2 can be as large as 4.096 ms plus a backoff time of the contention process. When further assuming that the data is not fully received until AP2's transmission is finished at the end of its TXOP, the total delay in BSS2 can be up to 8.192 ms plus the backoff time of the contention process. A resulting total roundtrip time of data may be at least twice of that, i.e., larger than 16 ms.

The above-mentioned delay before AP2 can transmit or receive may in some cases be too large for certain demanding scenarios, like for example such a factory environment where the transmitted data is used for cloud based control of robots. While TXOP sharing may help to some degree in reducing the delay by means of allowing a set of APs to access the channel at the same time or in succession within a TXOP, this is only possible for data which is already buffered at the time when coordinating the TXOP sharing, i.e., at the beginning of the TXOP. For data which arrives later during the TXOP, it is not possible for the AP to be included in the shared TXOP. Accordingly, during an ongoing TXOP, it is not possible for a non shared AP to transmit before the current TXOP ends.

When referring back to the scenario of FIG. 2, it could also happen that the requirements for BSS1 and BSS2 differ in that BSS2 has short and recurring transmissions of data with high latency and reliability requirements, whereas BSS1 has transmissions of data requiring high throughput, but less strict requirements on latency and reliability. FIG. 3B shows an example to illustrate that with the existing TXOP sharing mechanism it may be difficult to achieve the low latency requirement for BSS2. In the illustrated example, data (D) for AP2 arrives at a constant rate from higher layers. However, there may be varying channel access delays D1, D2 before AP2 can transmit the data, and these channel access delays may result in not complying with the latency requirement. Further, the intermittent usage of the channel by AP2 also adversely affects the throughput which can be achieved for AP1. For example, when assuming that one of the STAs 22 transmits 114 bytes of data along with an acknowledgement (ACK) to AP2, using 20 MHz bandwidth in a HT (high throughput) configuration with 52 sub-bands, the transmission would take about 200 μs, which is about 5% of the maximum TXOP duration. The achievable throughput for AP1 would thus be reduced by at least 5%.

Accordingly, there is a need for techniques which allow for improved sharing of a TXOP, e.g., with respect to supporting low-latency data traffic.

SUMMARY

According to an embodiment, a method of controlling wireless transmissions in a wireless communication system is provided. According to the method, a wireless device contends for access to a medium. In response to gaining access to the medium, the wireless device reserves a TXOP on the medium. Further, the wireless device configures a set of resources in the reserved TXOP to be available to at least one other wireless device for one or more transmissions of data arriving after beginning of the TXOP.

According to a further embodiment, a method of controlling wireless transmissions in a wireless communication system is provided. According to the method, a wireless device detects reservation of TXOP by another wireless device. On a set of resources in the reserved TXOP, the wireless device transmits data arriving after beginning of the TXOP.

According to a further embodiment, a wireless device for a wireless communication system is provided. The wireless device is configured to contend for access to a medium. Further, the wireless device is configured to, in response to gaining access to the medium, reserve a TXOP on the medium. Further, the wireless device is configured to configure a set of resources in the reserved TXOP to be available to at least one other wireless device for one or more transmissions of data arriving after beginning of the TXOP.

According to a further embodiment, a wireless device for a wireless communication system is provided. The wireless device comprises at least one processor and a memory. The memory contains instructions executable by said at least one processor, whereby the wireless device is operative to contend for access to a medium. Further, the memory contains instructions executable by said at least one processor, whereby the wireless device is operative to, in response to gaining access to the medium, reserve a TXOP on the medium. Further, the memory contains instructions executable by said at least one processor, whereby the wireless device is operative to configure a set of resources in the reserved TXOP to be available to at least one other wireless device for one or more transmissions of data arriving after beginning of the TXOP.

According to a further embodiment, a wireless device for a wireless communication system is provided. The wireless device is configured to detect reservation of a TXOP by another wireless device. Further, the wireless device is configured to, on a set of resources in the reserved TXOP, transmit data arriving after beginning of the TXOP.

According to a further embodiment, a wireless device for a wireless communication system is provided. The wireless device comprises at least one processor and a memory. The memory contains instructions executable by said at least one processor, whereby the wireless device is operative to detect reservation of a TXOP by another wireless device. Further, the memory contains instructions executable by said at least one processor, whereby the wireless device is operative to, on a set of resources in the reserved TXOP, transmit data arriving after beginning of the TXOP.

According to a further embodiment of the invention, a computer program or computer program product is provided, e.g., in the form of a non-transitory storage medium, which comprises program code to be executed by at least one processor of a wireless device is provided. Execution of the program code causes the wireless device to contend for access to a medium. Further, execution of the program code causes the wireless device to, in response to gaining access to the medium, reserve a TXOP on the medium. Further, execution of the program code causes the wireless device to configure a set of resources in the reserved TXOP to be available to at least one other wireless device for one or more transmissions of data arriving after beginning of the TXOP.

According to a further embodiment of the invention, a computer program or computer program product is provided, e.g., in the form of a non-transitory storage medium, which comprises program code to be executed by at least one processor of a wireless device is provided. Execution of the program code causes the wireless device to detect reservation of a TXOP by another wireless device. Further, execution of the program code causes the wireless device to, on a set of resources in the reserved TXOP, transmit data arriving after beginning of the TXOP.

Details of such embodiments and further embodiments will be apparent from the following detailed description of embodiments.

DETAILED DESCRIPTION OF EMBODIMENTS

Figure 1A:
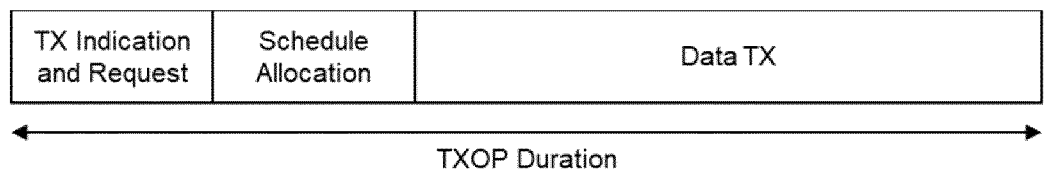
FIGS. 1A, 1B, 1C, 1D, and 1E schematically illustrate an example of a procedure for sharing of a TXOP by multiple APs.
Figure 1B:
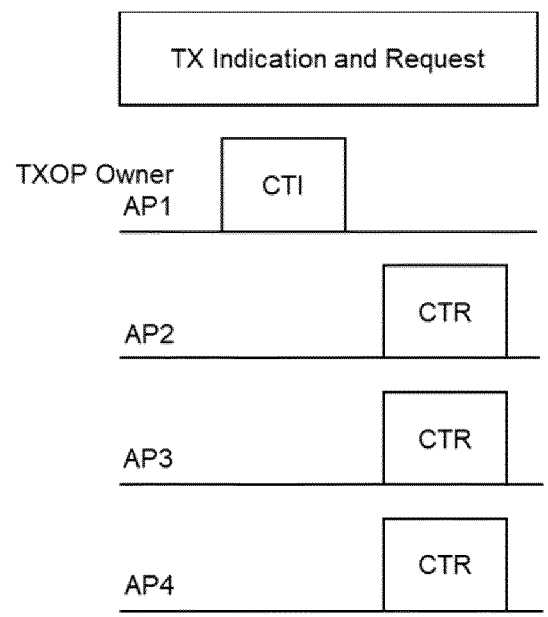
Figure 1C:
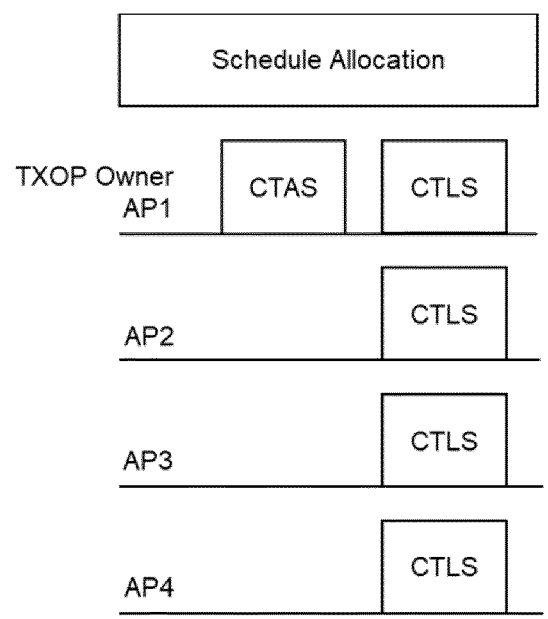
Figure 1D:
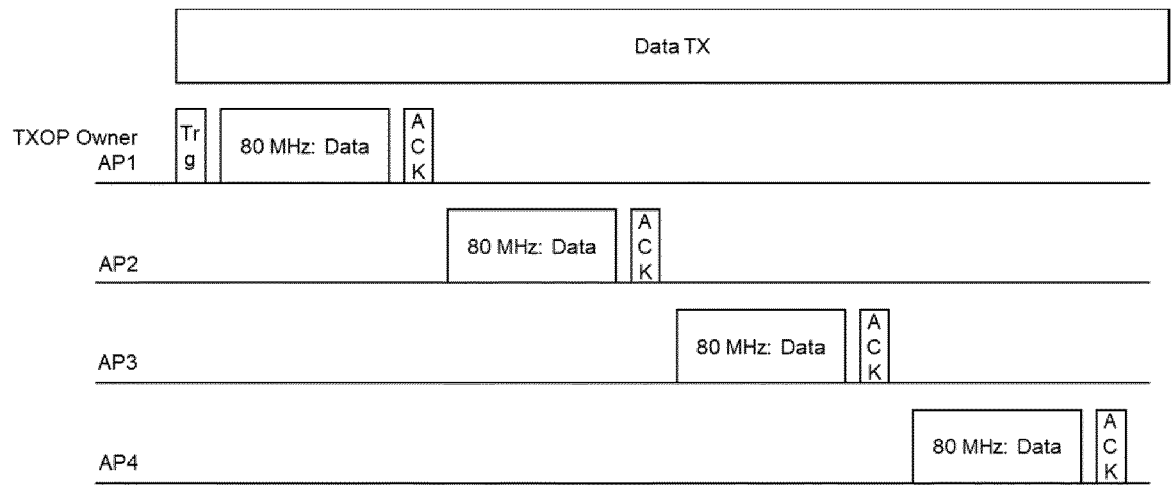
Figure 1E:
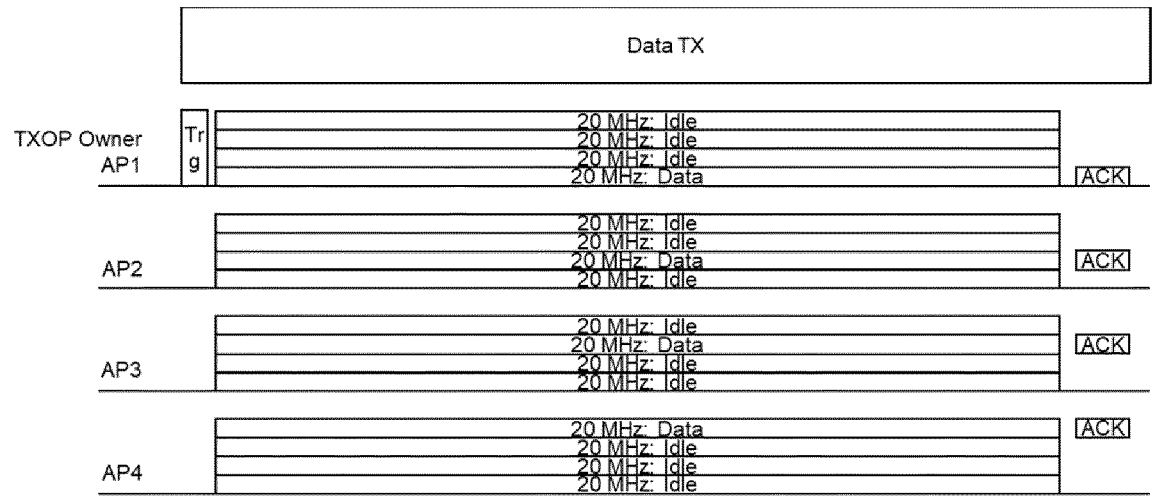
Figure 2:
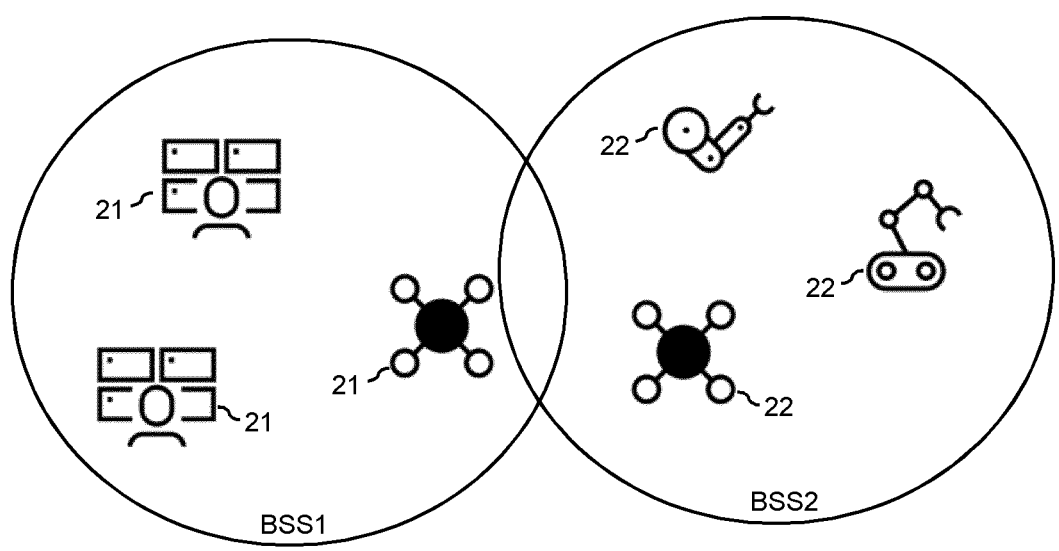
FIG. 2 schematically illustrates an example of a scenario with coexisting BSSs which are subject to different requirements on transmitted data.
Figure 3A:
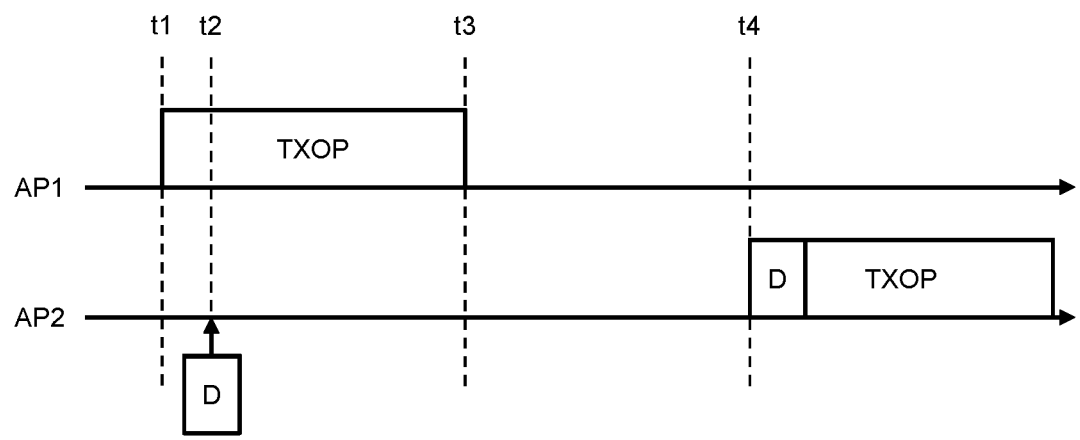
FIGS. 3A and 3B show examples for illustrating problems that may occur with existing TXOP sharing mechanisms.
Figure 3B:
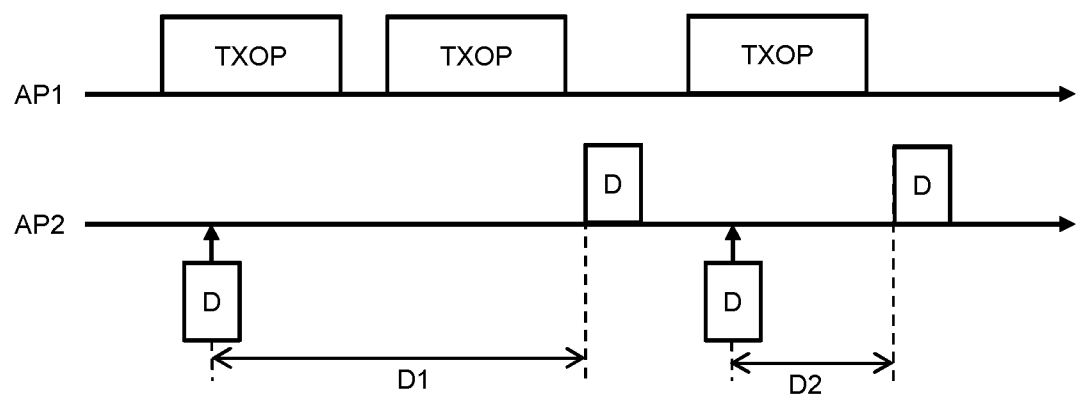

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP ($3^{rd}$ Generation Partnership Project). The illustrated concepts may be implemented by various types of wireless devices, in particular by Access Points (APs) and/or by non-AP Stations (STAs).

The illustrated concepts aim at enabling low-latency data communication in situations where a wireless device has reserved a TXOP on a medium. The low-latency communication may in particular be enabled for transmissions of small amounts of data, e.g., related to a service having high priority. At the same time, the TXOP may be used for enabling high throughput for other transmissions. Accordingly, the illustrated concepts may be beneficial in scenarios where two or more BSSs coexist in the same space and one of the BSSs serves a first set of STAs with a first set of requirements and another of the BSSs serves a second set of STAs with a second set of requirements, differing from the first set of requirements, e.g., in a factory environment involving cloud-based control of robots.

The illustrated concepts are based on sharing of resources in a TXOP by wireless devices. In particular, when a TXOP is reserved by a wireless device, a set of resources within the TXOP is configured to be available to one or more other wireless devices for transmission of data arriving after start of the TXOP. As used herein, arrival of data typically denotes a process where data for transmission is provided by a higher layer. For example, the arrival of data may involve that a higher layer entity provides data to be transmitted to a PHY entity of the wireless device. After arrival of the data, the data may be buffered before it is transmitted by the wireless device.

The set of resources may thus be regarded as a special reservation within the reserved TXOP. The set of resources may be configured based on negotiation or some other type of agreement between the wireless devices. In some scenarios, such agreement may be based on signaling used when establishing cooperative TXOP sharing by multiple APs (CAP TXOP sharing), e.g., by allowing also APs to participate in the CAP TXOP sharing which do not have data to transmit at the start of the TXOP, when establishing the CAP TXOP sharing. Further, the agreement could be based on other signaling by wireless devices. In some scenarios, the configured set of resources within the TXOP may be excluded from being allocated for transmission by the wireless device that reserved the TXOP and be used opportunistically by one or more other wireless devices. Such opportunistic usage may be contention based and/or be based on spatial reuse of at least a part of the set of resources. The set of resources may be defined in the time domain, e.g., in terms of one or more time slots, and/or in the frequency domain, e.g., in terms of one or more parts of the available bandwidth of the medium such as one or more sub-bands or sub-channels. In addition or as an alternative, the set of resources may be defined in terms of spatial resources, e.g., by designating a spatial region where re-use of the resources is possible.

It should be noted that the configured set of resources may be regarded as being reserved in a preemptive manner, without requiring knowledge whether a wireless device will actually need to transmit on the configured set of resources. Accordingly, in some cases at least a part of the set of resources may remain unused or be inefficiently re-used. While this may appear as a waste of resources, it may provide benefits by enabling efficient low-latency transmission of small amounts of critical data by certain wireless devices. The size of the set of resources may be relatively small as compared to the overall size of the reserved TXOP, e.g., correspond to 1-10%, typically 1-5% of the overall size of the reserved TXOP. Further, any interference caused by a transmission on the set of resources may be compensated, e.g., by using a suitably robust coding for transmissions in the TXOP.

Figure 4:
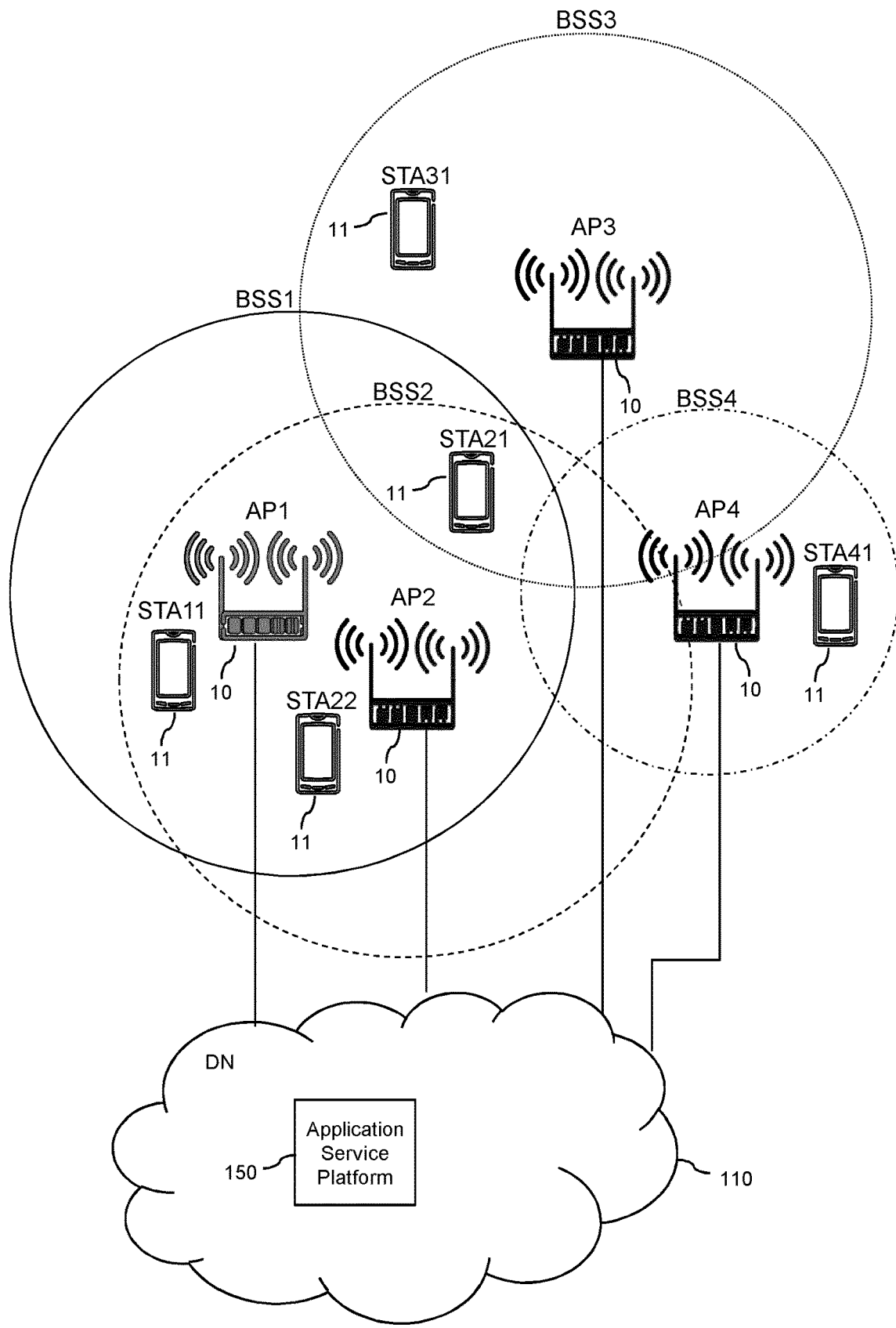
FIG. 4 schematically illustrates a wireless communication system according to an embodiment.

FIG. 4 illustrates an exemplary wireless communication system according to an embodiment. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, STA32, and STA41. The station STA11 is served by AP1 (in a first BSS denoted as BSS1), the stations STA21 and STA22 are served by AP2 (in a second BSS denoted as BSS2). The stations STA31 and STA32 are served by AP3 (in a third BSS denoted as BSS3). The station STA41 is served by AP4 (in a fourth BSS denoted as BSS4). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 4, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 4 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 4, coordination between the cells or BSSs may be utilized. For example, at least some of the involved APs 10 may contend for and share common resources. In particular, two or more of the APs 10 may contend for the same wireless medium or radio channel in order to obtain a TXOP. Then, the winning AP 10 can share the resources with the other contending APs in a dynamic fashion. For example, it can share the resources differently in different TXOPs. The wireless medium or radio channel may be based on one or more carriers, e.g., OFDM carriers.

In the following explanations, two different types of data arrival may be considered: A) Periodic data traffic, i.e., data traffic that arrives at predictable and periodic time instances, in some cased with a certain amount of jitter with respect to the periodic time instances. For example, data of a certain service could arrive every 5 ms. Periodic data traffic is for example typical in the case of robot-control data, positioning data, periodic measurements, voice/video traffic, or gaming data, or the like. B) Non-periodic data traffic, i.e., data traffic that can arrive at any time. In some cases, the non-periodic data traffic may be subject to high priority requirements. Examples of non-periodic data traffic include emergency messages, such as for public safety.

Figure 5:
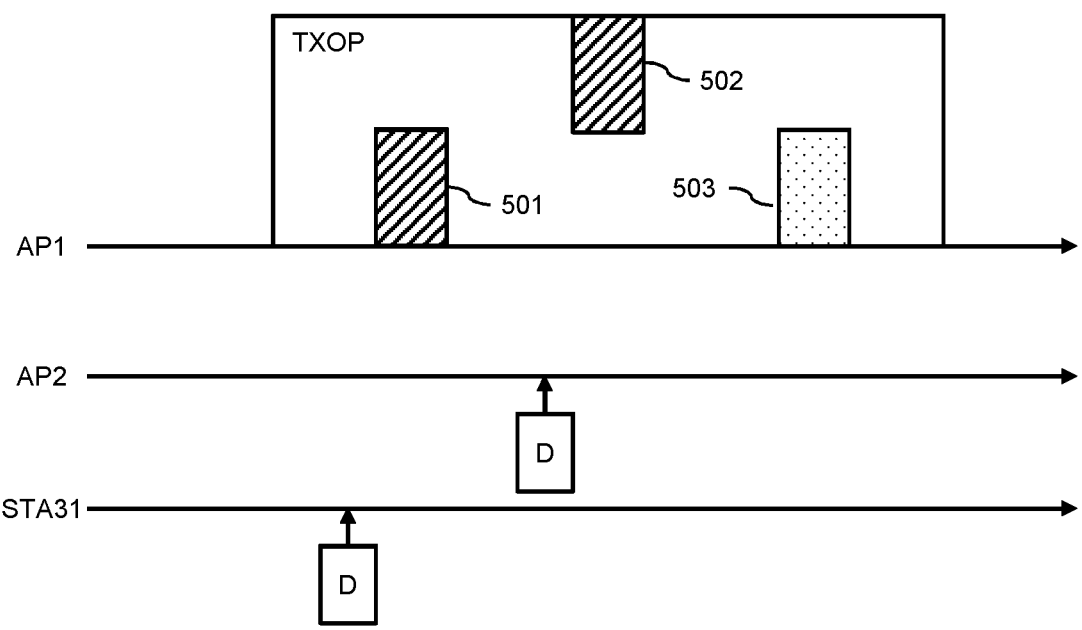
FIG. 5 schematically illustrates sharing of a TXOP according to an embodiment.

FIG. 5 schematically illustrates how the configured set of resources can be used for enabling low-latency transmission of critical data within a reserved TXOP. The example of FIG. 5 involves AP1 and AP2, and STA31, which is not associate to AP1 or AP2. The example of FIG. 5 assumes that AP1 reserves a TXOP, e.g., to be used by AP1 for transmission of data to one or more STAs associated with AP1. As can be seen, a set of time-frequency resources 501, 502, and 503 is configured within the TXOP. These time-frequency resources are not used for transmissions from or to AP1 and rather kept available to other wireless devices, which are not associated with AP1, for low-latency transmissions of data (D) arriving after start of the TXOP. In the example of FIG. 5, STA31 transmits such data arriving after start of the TXOP in the time-frequency resources 501, and AP2 transmits such data arriving after start of the TXOP in the time-frequency resources 502. The time-frequency resources 503 remain unused.

In some scenarios, the usage of the configured set of resources can be contention based. Accordingly, the set of resources is not allocated to any specific wireless device. The contention-based usage of the set of resources may for example be based on an UORA (Uplink OFDMA Random Access) mechanism as described in "Performance Analysis of Uplink Multi-User OFDMA in IEEE 802.11ax" by G. Naik et al., 2018 IEEE International Conference on Communications (ICC) (2018).

Still referring to FIG. 5, when for example assuming that AP2 and STA31 have data to transmit before the first time time-frequency resources 501, they might both try to transmit in the time-frequency resources 501, resulting in a collision. To limit such collisions, at the beginning of the TXOP each wireless device not yet having any data to transmit may select a starting value of a counter as an integer between 1 and N based on a uniform random distribution, with N corresponding to the number of available time-frequency resources, i.e., N=3 in the illustrated example. For example, AP2 could selects 1, and STA31 could select 2. Whenever one of the time-frequency resources 501, 502, 503 becomes available in the TXOP, each wireless device decreases its counter by one, and only the wireless device with the counter having a value equal to zero and having data to transmit is allowed to transmit. In the example of FIG. 5 this results in AP2 transmitting in the first time-frequency resources 501 and STA31 transmitting in the second time-frequency resources 502.

The usage of the configured set of resources in the TXOP may also be subject to one or more conditions. For example, usage of the configured set of resources could be allowed only for one or more specific access categories and high priority data within this access category. Further, usage of the configured set of resources could be allowed only at certain locations.

Figure 6:
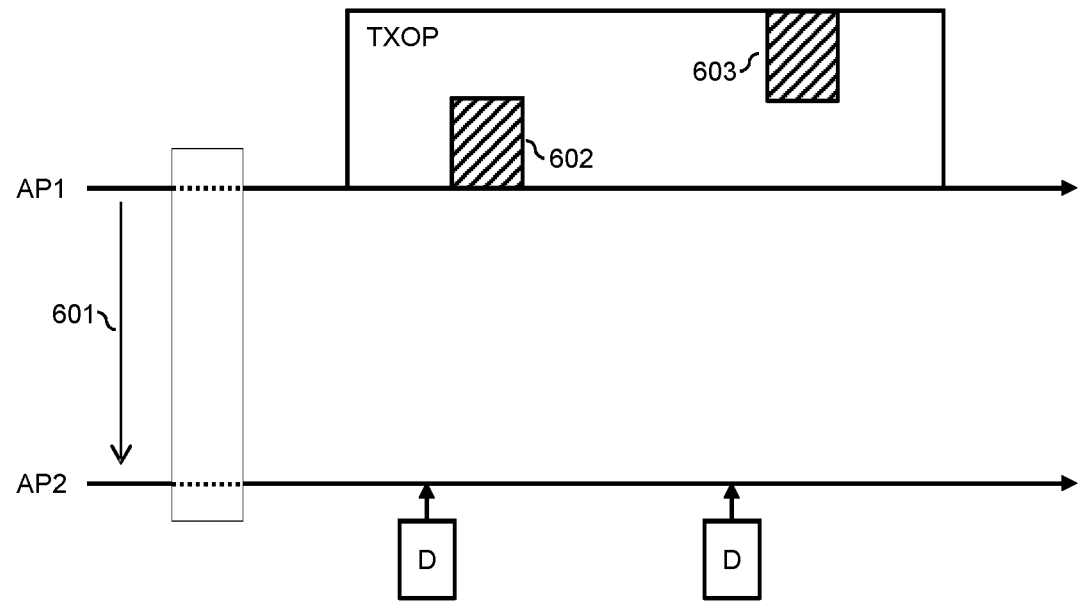
FIG. 6 schematically illustrates a further example of sharing of a TXOP according to an embodiment.

As mentioned above, the configuration of the set of resources which is kept available for low-latency transmissions may be configured based on negotiation or some other type of agreement between the involved wireless devices. In some scenarios, such agreement may be based on a broadcast message from one of the wireless devices, e.g., from the wireless device that reserved the TXOP. FIG. 6 shows a corresponding example.

In the example of FIG. 6, it is assumed that AP1 sends a broadcast message 601 which is received by AP2. The broadcast message 601 may indicate that in a TXOP reserved by AP1, a set of resources will be kept available for low-latency transmissions by other wireless devices. The broadcast message 601 may for example correspond to a beacon frame. The beacon frame may for example be used in processes for associating STAs with AP1 and may be broadcasted according to a regular schedule. In the example of FIG. 6, it is assumed that the set of resources configured by the broadcast message 601 includes time-frequency resources 602, 603. In the example of FIG. 6, AP2 uses the time-frequency resources 602, 603 of the configured set to transmit data arriving during the TXOP reserved by AP1.

The broadcast message 601 may indicate the set of resources, e.g., in terms of one or more time slot(s) and/or in terms of frequency resources within the TXOP. Further, the broadcast message 601 may indicate for which type of traffic usage of the configured set of resources is allowed. For example, usage of the set of resources can be limited to emergency messages for public safety use or to messages for periodic data with high priority. Further, the broadcast message may indicate fairness criteria, e.g., criteria indicating how many times a certain wireless device is allowed to use resources from the configured set.

Figure 7:
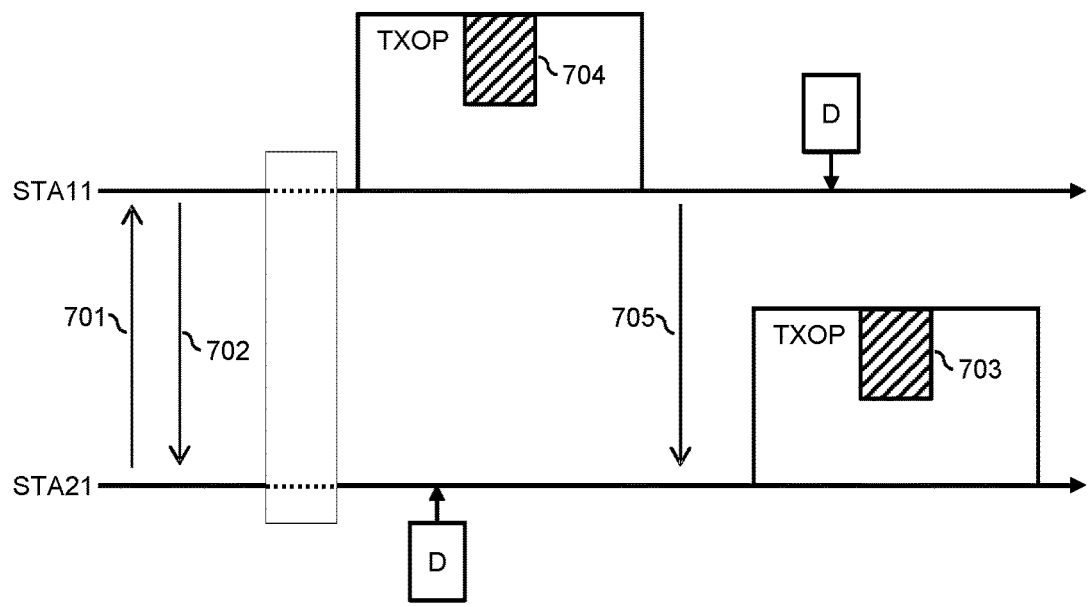
FIG. 7 schematically illustrates a further example of sharing of a TXOP according to an embodiment.

In some scenarios, the agreement on the set of resources which is kept available for low-latency transmissions may also involve a handshake message exchange between the involved wireless devices. FIG. 7 illustrates a corresponding example. The handshake message exchange may for example include a request transmitted by one of the wireless devices and a response to the request transmitted by another one of the wireless devices. The handshake message exchange may for example be part of a process for associating STAs to APs. As illustrated, the handshake message exchange takes place before start of a TXOP reserved by one or more of the wireless devices. In the example of FIG. 7, the handshake message exchange involves that STA21 sends a request message to STA11 and that STA11 responds with a response message 702.

The request message 701 may for example indicate a minimum size of messages to be transmitted on the set of resources. Further, the request message 701 may indicate a suggested period that the agreement concerning the set of resources will be valid, e.g., in terms of a number of successive TXOPs or a time interval. Further, the request message 701 may indicate whether the wireless device sending the request message 701, i.e., in the illustrated example STA21, is itself willing to provide resources for low-latency traffic in a reserved TXOP. Accordingly, the agreement may be mutual for at least some of the wireless devices. If the wireless device sending the request message 701, i.e., in the illustrated example STA21, is itself willing to provide resources for low-latency traffic in a reserved TXOP, the request message 701 may also indicate if the set of resources requested share resources himself and whether the set of resources provided by the requesting wireless device is equal, e.g., in terms of time-frequency resources within the TXOP, to the set of resources to be provided by the wireless device receiving the request message 701. In the example of FIG. 7, it is assumed that the request message 701 indicates that in a TXOP reserved by STA21, time-frequency resources 703 are kept available for low-latency traffic. Still further, the request message 701 may indicate information on the traffic to be transmitted on the set of resources, e.g., how often the traffic is expected to occur and/or a priority of the traffic.

The response message 702 may for example indicate the set of resources which will be kept available for low-latency transmissions in the TXOP(s) reserved by the wireless device transmitting the response message 702, in the illustrated example STA11. More specifically, in the example of FIG. 7, it is assumed that the response message 702 indicates that in a TXOP reserved by STA11, time-frequency resources 704 will be kept available for low-latency transmissions. Further, the response message 702 may indicate a period that the agreement concerning the set of resources will be valid, e.g., in terms of a number of successive TXOPs or a time interval. This period may be based on the suggested period indicated in the request message 701. As mentioned above, in some scenarios the agreement concerning the set of resources kept available for low-latency transmissions may be mutual. In such cases, the response message 702 may include similar information as the request message 701. Based on the mutual agreement concerning the set of resources kept available for low-latency transmissions, STA21 uses the time-frequency resources 704 to transmit data (D) arriving during the TXOP reserved by STA11, and STA11 uses the time-frequency resources 703 to transmit data (D) arriving during the TXOP reserved by STA21.

In some scenarios, the agreement concerning the set of resources kept available for low-latency transmissions may also be revoked by one of the involved wireless devices. In the example of FIG. 7, STA11 sends a revoke message 705 to STA21 to indicate that STA11 no longer provides the set of resources for low-latency transmissions. Such revoke message may also indicate a reason for revocation of the agreement, e.g., a lack of available resources. In the example of FIG. 7, it is assumed that the revocation concerns only the part of the agreement related to the resources provided by STA11 and STA21 thus continues to provide the resources 703. It would however also be possible to revoke the agreement for each involved wireless device, e.g., also for STA21.

Figure 8A:
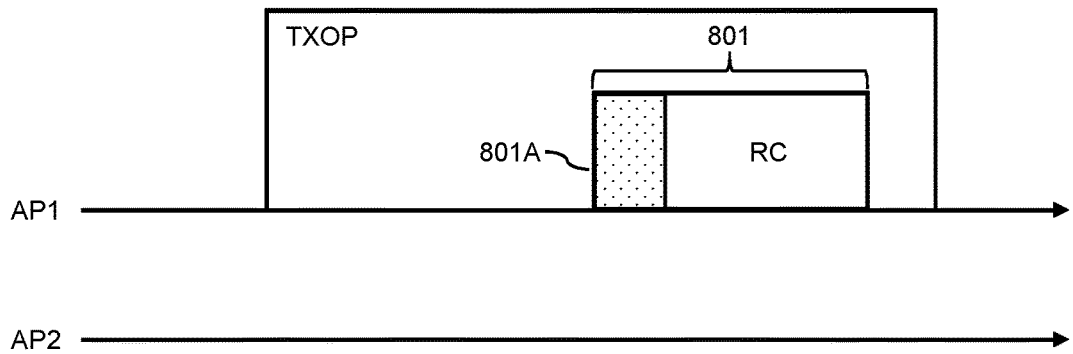
FIGS. 8A and 8B show a further examples of sharing of a TXOP according to an embodiment.
Figure 8B:
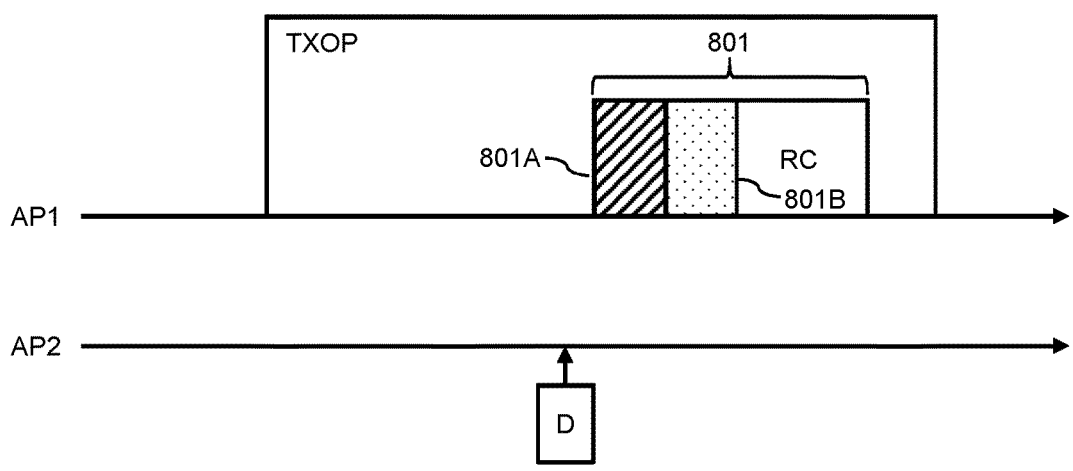

In some scenarios, the set of resources which is kept available for low-latency transmissions by other wireless devices may also be reclaimed by the wireless device which reserved the TXOP. FIGS. 8A and 8B illustrate examples of corresponding scenarios. In each of these examples, it is assumed that AP1 reserves a TXOP and makes time-frequency resources 801 within the reserved TXOP available to be used by AP2 for low-latency transmissions. In the example of FIG. 8A, AP1 detects that an initial part 801A of the time-frequency resources 801 is unused. In response to detecting the unused part 801A of the time-frequency resources 801, AP1 reclaims a remaining part RC of the time-frequency resources 801. The reclaimed part of the time-frequency resources 801 may then be used for transmissions by AP1. In the example of FIG. 8B, AP2 uses an initial part 801A of the time-frequency resources 801 to transmit data (D) arriving during the reserved TXOP and then detects that a further part 801B of the time-frequency resources 801 is unused. In response to detecting the unused part 801B of the time-frequency resources 801, AP1 reclaims a remaining part RC of the time-frequency resources 801. The reclaimed part of the time-frequency resources 801 may then be used for transmissions by AP1.

It is noted that the concepts as illustrated in connection with FIGS. 5 to 7, 8A, and 8B are applicable to APs and non-AP STAs. Accordingly, in the examples where the TXOP is reserved by an AP, the AP could also be replaced by a non-AP STA. Similarly, in the example of FIG. 5, STA31 could be replaced by an AP or AP2 could be replaced by a further STA which is not associated to AP1, and in FIGS. 6, 8A, and 8B AP2 could be replaced by a STA that is not associated to AP1. In the example of FIG. 7, at least one of STA11 and STA21 could be replaced by an AP.

In some scenarios, the set of resources which is kept available for low-latency transmissions by other wireless devices may also be provided in a TXOP which is cooperatively shared by multiples APs, i.e., is subject to CAP TXOP sharing. In the following, examples of such scenarios will be explained with reference to FIGS. 9, 10, 11A, 11B, and 12. In these examples, an AP that is sharing its reserved TXOP is denoted as sharing AP or TXOP owner, and the other APs participating in the sharing of the TXOP are denoted as shared TXOP. An AP that has critical data to transmit is denoted as AP with critical data (APc).

Figure 9:
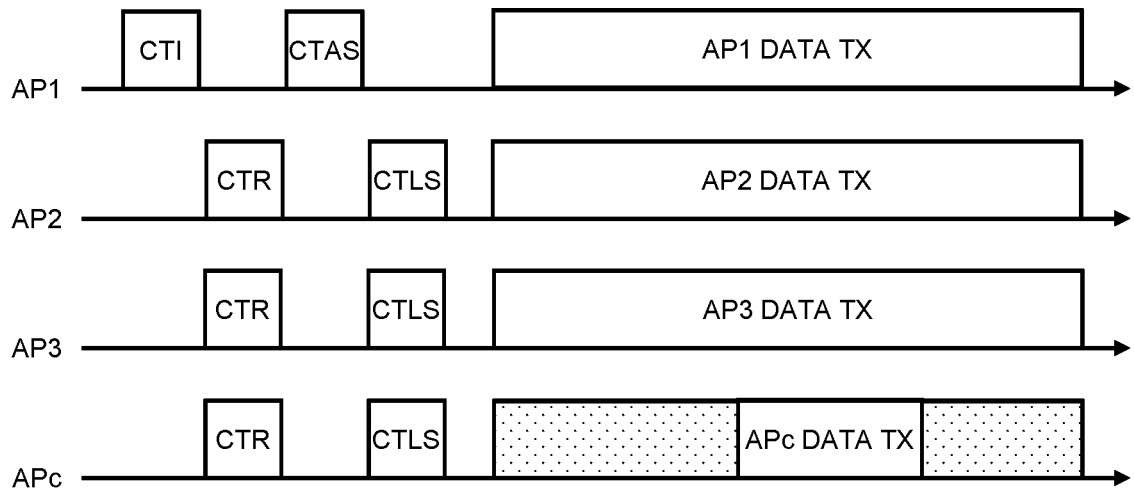
FIG. 9 shows a further example of TXOP sharing according to an embodiment.

In the example of FIG. 9, it is assumed that AP1 is the sharing AP or TXOP owner, and that CAP TXOP sharing is established by AP1 sending an a CTI message, and the APs willing to participate in the sharing of the TXOP, in the illustrated example AP2, AP3, and APc, respond with a CTR message. By means of the CTI message, AP1 notifies the other APs that it has obtained the TXOP and is willing to share it. By means of the CTR, AP2, AP3, and APc notify AP1 that they are willing to participate in the sharing of the TXOP. More example, it is assumed that at the start of the TXOP, when the CTI message is transmitted, AP2 and AP3 have data buffered for transmission. As compared to that APc does not have data buffered for transmission, but is known to require regular or irregular transmissions of critical data. Accordingly, also APc is allowed to participate in the sharing of the TXOP. Establishment of the CAP TXOP sharing thus continues by AP1 sending a CTAS message indicating resources of the TXOP which are respectively allocated to the respective APs, and the participating APs inform their associated stations about their respectively allocated resources according to local scheduling within the BSS of the participating AP, by sending a CTLS message. The resource allocation for APc is performed in a preemptive manner by assuming that for APc there is a potential need to transmit critical data.

In some scenarios, APc may be allowed to participate in the CAP TXOP sharing if it fulfills certain criteria related to the expected arrival of the critical data. Such criteria may for instance be related to the nature of expected time, e.g., whether the critical data corresponds to periodic or to non-periodic data traffic. For example, APc could be allowed to participate in the CAP TXOP sharing if the critical data corresponds to periodic data traffic, but not if the critical data corresponds to non-periodic data traffic. For the periodic data traffic, the resource allocation of APc may be determined based on the periodic characteristics of the critical data, e.g., by predicting times of arrival of the critical data.

In some scenarios, APc may be allowed to participate in the CAP TXOP sharing if a prediction metric related to the critical data fulfills a certain criterion. For example, the prediction metric may be defined in terms of a probability that critical data to be transmitted arrives during the TXOP. If this probability is above a threshold, APc may be allowed to participate in the CAP TXOP sharing.

In some scenarios, whether APc is allowed to participate in the CAP TXOP sharing may depend on a type of the critical data. For example, In some scenarios, APc may be allowed to participate in the CAP TXOP sharing if the critical data corresponds to emergency data, e.g., of a public safety service, to voice traffic or video traffic, or to V2X (vehicle-to-anything) communication data.

Figure 10:
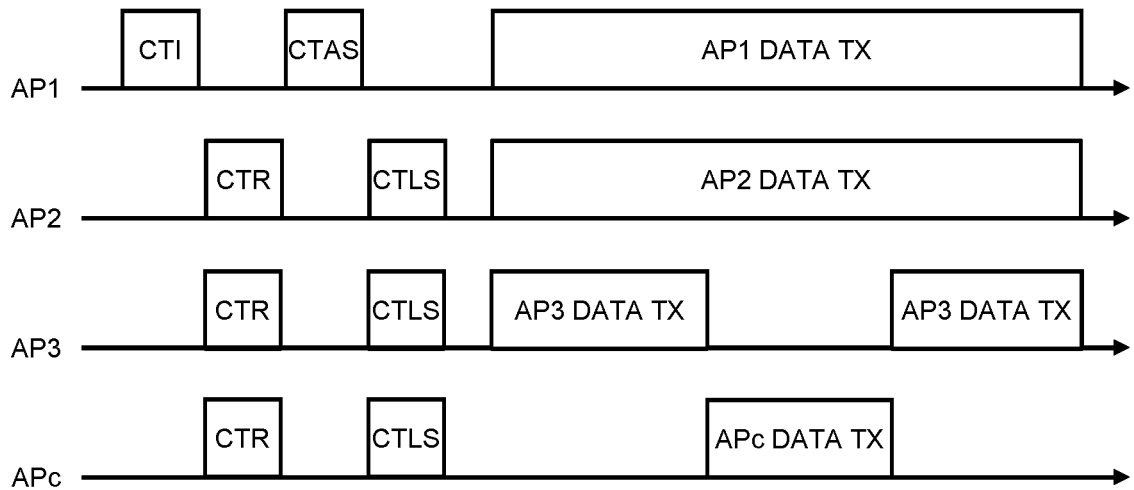
FIG. 10 shows a further example of TXOP sharing according to an embodiment.

In the example of FIG. 9, the CAP TXOP sharing involves that resources of the TXOP are allocated to APc, even though it may happen that these resources are left unused by APc. In FIG. 9 this is illustrated by a shaded region before and after transmission of data by APc (denoted as APc DATA TX). In order to avoid wasting of resources of the TXOP, it is desirable to predict the need of resources by APc as precisely as possible and to configure the resource allocation by the CTAS message accordingly. FIG. 10 illustrates an example, where AP1 is assumed to be able to precisely predict when APc has critical data to transmit and allocates resources to APc only at the time of the predicted need to transmit the critical data. In particular, a set of resources of the TXOP is allocated to APc while APc needs to transmit the critical data, and at other times this set of resources is allocated to AP3. As a result, the resource allocation of APc is "enclosed" by the resource allocation of AP3. A time spacing between transmissions by AP3 and the transmission by APc may for example correspond to a SIFS (Short Interframe Space).

Figure 11A:
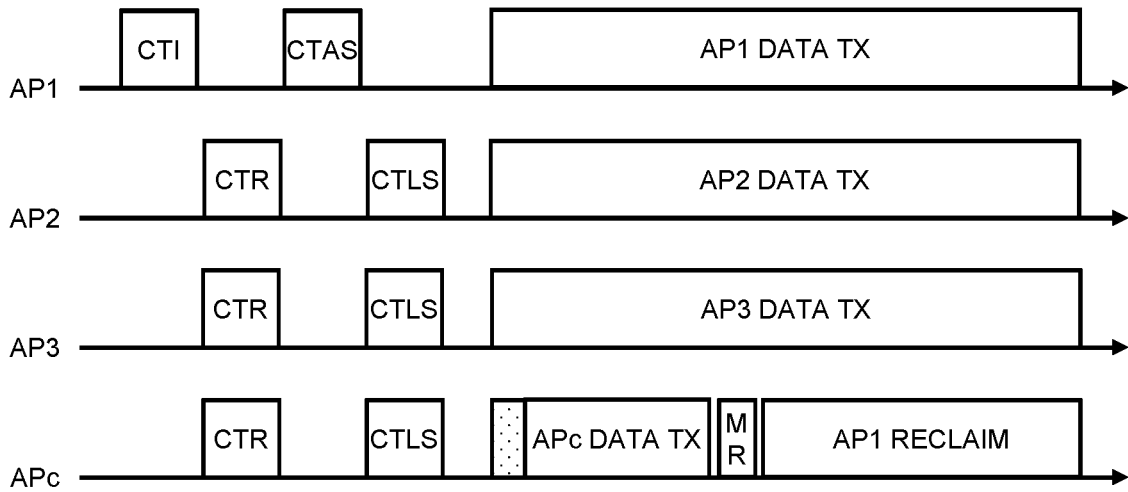
FIGS. 11A and 11B show a further examples of sharing of a TXOP according to an embodiment.
Figure 11B:
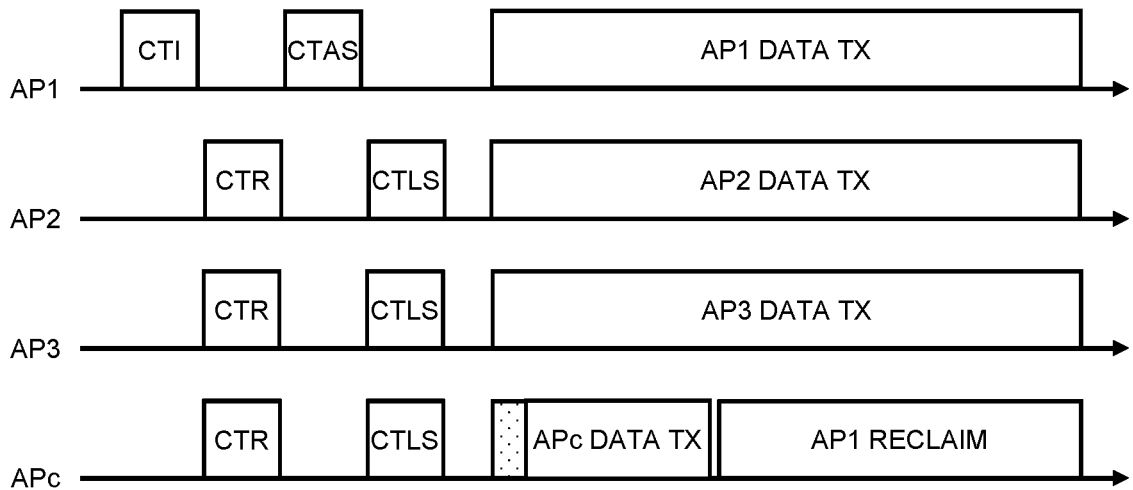

In some scenarios, the sharing AP may reclaim the resources allocated to an AP with critical data. FIGS. 11A and 11B illustrate examples of corresponding scenarios. In the example of FIG. 11A, a certain set of resources of the TXOP is allocated to APc to be used for potential transmissions of the critical data. After APc has performed a transmission of critical data, as indicated by APc DATA TX, APc sends a medium return (MR) message to indicate release of its allocated resources. In some cases, APc may send the MR message in response to the transmission of the critical data being acknowledged. In response to detecting the MR message, AP1 reclaims the remaining part of the set of resources and may use this part for its own data transmissions. The MR message may be a dedicated data frame or a data field within some other data frame. If APc wants to release only a part of its allocated resources, for example only some part of the allocated bandwidth or only some allocated time slots, MR message may indicate those parts of the allocated resources which are being released. The MR message may be sent on the resources allocated to APc. Alternatively, the MR message could be sent on other resources, e.g., a reserved control channel, or using another interface.

In the example of FIG. 11B, AP1 reclaims resources allocated to APc without requiring transmission of an MR message. In this example, it is assumed that AP1 detects that APc has completed its transmission of critical data, as indicated by APc DATA TX, and then reclaims the remaining part of the set of resources allocated to APc and may use this part for its own data transmissions. In a similar manner, AP1 could reclaim the remaining part of the set of resources allocated to APc when a time predicted for the transmission of the critical data ends.

As can be seen from the examples of FIGS. 11A and 11B, the sharing AP, i.e., AP1, may reclaim a part of the resources allocated to APc once APc has transmitted its critical data. In some cases, AP1 could also reclaim a part of the resources allocated to APc once the transmission of critical data by APc is acknowledged.

In some scenarios, reclaiming of the resources allocated to APc may also be controlled based on usage of the allocated resources by APc in past TXOPs. For example, if APc does not utilize its allocated resources for multiple shared TXOPs, AP1 may reclaim the allocated resources in the ongoing TXOP and/or refuse to allow participation of APc in the CAP TXOP sharing in future TXOPs. Such reclaiming of allocated resources may also be indicated by a message transmitted from AP1 to APc.

Figure 12:
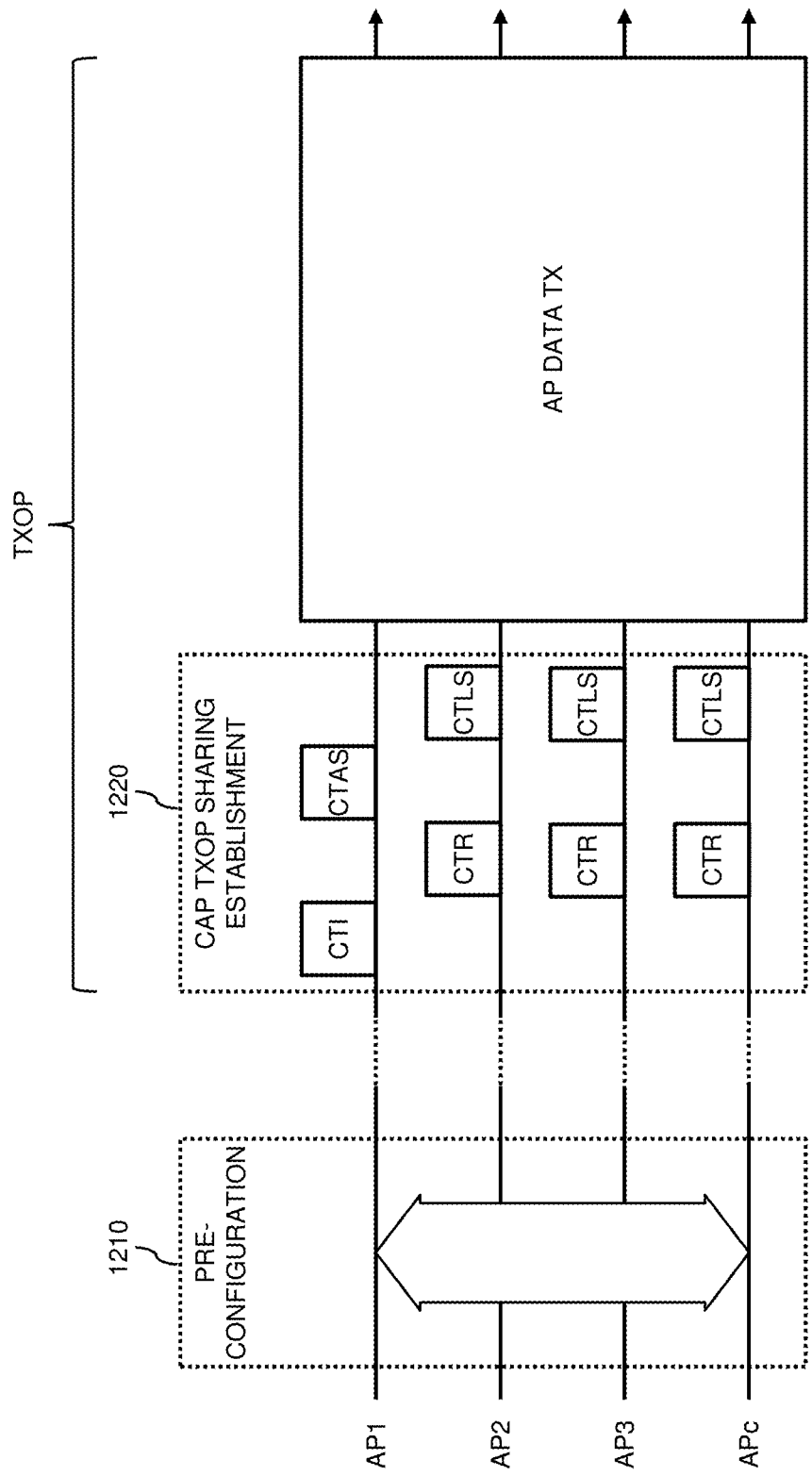
FIG. 12 shows a further example of TXOP sharing according to an embodiment.

FIG. 12 shows an example for illustrating signaling that may be used for controlling the CAP TXOP sharing involving an APc with a potential need to transmit critical data. As illustrated, the signaling may be organized in two parts: a pre-configuration part 1210 and a CAP TXOP establishment part 1220. The pre-configuration part 1210 may for example be used for exchanging information among the APs to identify APs with critical data and/or to indicate capabilities of the respective APs. The pre-configuration part 1210 may in part be based on beacon frames transmitted by the APs. The CAP TXOP establishment part 1220 configures the sharing of a particular TXOP when it is reserved by one of the APs.

In some scenarios, the pre-configuration part 1210 of the signaling may involve discovering that an AP is capable of CAP TXOP sharing, e.g., by transmitting corresponding capability information. Further, the pre-configuration part 1210 of the signaling may be used to exchange information on the data transmitted by an AP, such as periodicity, typical data size, typical data types. Such information may also be referred to as a traffic pattern of an AP. The traffic patterns may then be used to identify if the AP could participate in CAP TXOP sharing for critical data and/or to prioritize among the critical data of different APs. In some scenarios, traffic patterns of the APs may also be repeatedly signaled by the APs, e.g., according to a regular schedule and/or in response to a change of the traffic pattern of an AP.

In some scenarios, at least a part of the information exchange in the pre-configuration part 1210 could also pre-configured in the APs, e.g., based on operator settings or manufacturer settings.

The CAP TXOP sharing establishment part 1220 may involve a CTI message transmitted by the sharing AP, in the illustrated example AP1, CTR messages transmitted by the shared APs, in the illustrated example AP2, AP3, and APc, a CTAS CTI message transmitted by the sharing AP, and CTLS messages transmitted by the shared APs. At least some of these messages may be supplemented by flags or other indicators for controlling the preemptive allocation of resources for critical data.

In some scenarios, the CTI message may include a flag or other indicator which informs the shared APs that preemptive scheduling for critical data is allowed. Further, the CTI message may also indicate one or more criteria related to the preemptive scheduling, e.g., indicating rules or conditions for predicting arrival of critical data.

In some scenarios, the CTR message may indicate to the sharing AP that the shared AP expects a need to transmit critical data. Further, the CTR message may also indicate information which enables the sharing AP to predict the arrival of the critical data. Such information may for example include: a probability of data arriving within a certain time interval, e.g., quantized in terms of a probability metric, an expected amount of data, e.g., in terms of a typical size of a message used to transmit the critical data and/or a typical number of such messages, an arrival-type of the critical data, e.g., whether the critical data corresponds to periodic data traffic or to non-periodic data traffic, a category of the critical data, such as data related to a public safety service, emergency data, or V2X communication data. Further, the CTR message may indicate that the shared AP supports fragmentation of its allocated resources, to insert resources for transmission of critical data.

In some scenarios, the transmission of the critical data by APc may be based on spatial reuse of at least some resources of the TXOP. In such cases, the CTR message transmitted by APc may include an indication that it intends to spatially reuse resources of the TXOP. The sharing AP, i.e., AP1 of the illustrated example, may then assign one or more channels, possibly for concurrent downlink and uplink transmissions, that APc may spatially reuse for the transmission of critical data. The sharing AP may also informs the other shared APs, i.e., AP2 and AP3 of the illustrated example, that part of their allocated resources could be subject to spatial reuse.

Here, the sharing AP could for example select the channel(s) to be reused in such a way that the spatially reusing AP is spaced by more than a threshold distance from other shared APs using the channel.

Further, the CTI message may include a flag or other indicator informing the shared APs that the sharing AP may reclaim allocated resources and, optionally, under which criteria the reclaiming will occur, e.g., if the allocate resources are left unused for a certain time or if the expected transmission of critical data was completed.

In some scenarios, an AP which participates in the CAP TXOP sharing for critical data like APc may be identified by a specific identifier which allows for distinguishing this AP from other APs which participate in the TXOP sharing to transmit regular data already buffered when the TXOP starts. In some scenarios, such an identifier may also be used to implicitly indicate the resources that are allocated for a potential transmission of the critical data, e.g., in terms of one or more time slots and/or or parts of the available bandwidth.

As mentioned above, the set of resources in the TXOP which is provided for low-latency transmissions of critical data may be defined in terms of time resources, frequency resources, and/or spatial resources. In some scenarios, the usage of the set of resources may be based on spatial reuse. For example, during a reserved TXOP, e.g., if two or more APs cooperate by sharing the TXOP, and a further AP or STA may have a need to transmit critical data arriving during the TXOP and this further AP may transmit the critical data by spatially reusing at least a part of the resources of the TXOP. The spatial reuse of the resources of the TXOP may be based on negotiation or some other agreement among the involved wireless devices.

To enable the spatial reuse of the resources of the TXOP, the reusing AP or STA may need to fulfill certain criteria, e.g., related to the type of the critical data. For example, the spatial reuse could exclusively be allowed for emergency data, e.g., data of a public safety service, for voice/video traffic, or for V2X communication data. Further, the spatial reuse could exclusively be allowed if transmissions of the critical data are expected to occur very rarely, e.g., based on their expected number in a given time interval not exceeding a threshold, and the expected time durations of the transmissions of critical data as compared to the length of the TXOP are short, e.g., based on the expected time durations not exceeding a certain percentage of the TXOP length.

In some scenarios, the spatial reuse may be allowed if the reusing AP or STA performs the transmissions of critical data using a low-order modulation and coding scheme (MCS) and/or a transmit power control mechanism.

In some scenarios, the spatial reuse may be allowed if the reusing AP or STA can guarantee, with probability above a threshold, that the reuse will not cause harmful interference on ongoing transmissions within the TXOP.

In some scenarios, the spatial reuse may be allowed if the reusing AP or STA is spaced from the receivers already scheduled in the TXOP by more than a threshold distance, and/or if channel gains toward receivers already scheduled in the TXOP are below a threshold.

Figure 13:
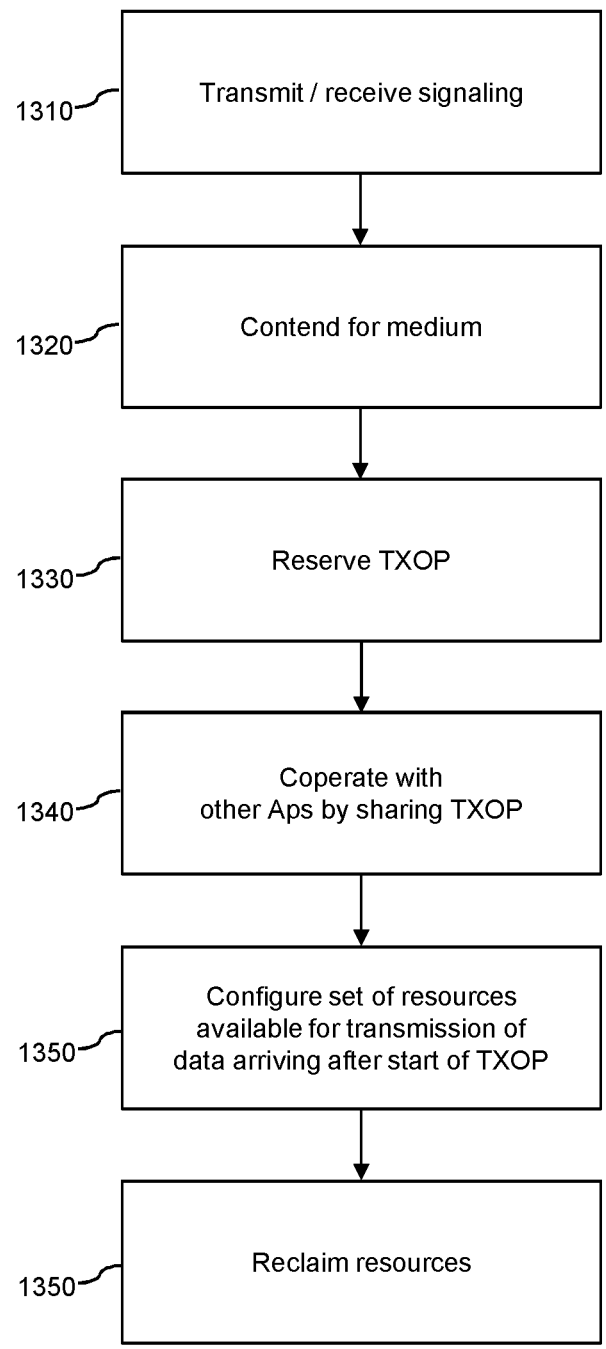
FIG. 13 shows a flowchart for schematically illustrating a method according to an embodiment.

FIG. 13 shows a flowchart for illustrating a method, which may be utilized for implementing the illustrated concepts. The method of FIG. 13 may be used for implementing the illustrated concepts in a wireless device. The wireless device may be an AP of a wireless communication system, such as one or the above-mentioned APs 10. In some scenarios, the wireless device may be a wireless station, in particular a non-AP STA, such as one or the above-mentioned STAs 11. The wireless communication system may be based on a wireless local area network, WLAN, technology, e.g., according to the IEEE 802.11 standards family.

If a processor-based implementation of the wireless device is used, at least some of the steps of the method of FIG. 13 may be performed and/or controlled by one or more processors of the wireless device. Such wireless device may also include a memory storing program code for implementing at least some of the below described functionalities or steps of the method of FIG. 13.

At step 1310, the wireless device may transmit or receive signaling. For example, step 1310 may involve that the wireless device sends one or messages to at least one other wireless device. In addition or as an alternative, step 1310 may involve that the wireless device receives one or messages from at least one other wireless device. For example, one or more of the above-mentioned messages 601, 701, 702, 705 could be part of the signaling transmitted or received at step 1310. Further, the signaling of step 1310 could include at least a part of the above-mentioned pre-configuration part 1210 of signaling and/or one more messages of the above-mentioned CAP TXOP establishment signaling 1220, e.g., a CTI message and/or a CTR message.

In some scenarios, the signaling may involve negotiation between the wireless device and the at least one other wireless device. In some scenarios, the signaling may involve that the wireless device transmits a broadcast message, e.g., a beacon frame.

At step 1320, the wireless device contends for access to a medium. This may involve performing a CCA (Clear Channel Assessment) or LBT (Listen Before Talk) procedure to assess whether the medium is occupied. The CCA or LBT procedure may be based on a contention window which is extended with each unsuccessful access attempt. In some scenarios, the wireless device may win the contention for access to the medium. In other scenarios, another wireless device may win the contention for access to the medium.

At step 1330, in response to winning the contention at step 1320, the wireless device reserves a TXOP on the medium. In some scenarios, reserving the TXOP may involve sending the above-mentioned CTI message.

At step 1340, if the wireless device is an AP, it may cooperate with one or more other APs by sharing the reserved TXOP, e.g., by using a CAP TXOP sharing process as explained in connection with FIG. 9, 10, 11A, 11B, or 12.

At step 1350, the wireless device configures a set of resources in the reserved TXOP to be available to at least one other wireless device for one or more transmissions of data arriving after beginning of the TXOP. 24. The at least one other wireless device may include at least one AP and/or at least one STA. The data may correspond to critical data requiring low-latency transmission.

At step 1350, the set of resources may be configured based on signaling performed by the wireless device and/or the least one other wireless device, e.g., based on the signaling of step 1310. In some scenarios, the signaling may include a message transmitted by the wireless device and the message may indicate the set of resources. Examples of such message are the above-mentioned broadcast message 601 or the above-mentioned response message 702. In some scenarios, the message may also indicate one or more criteria for under which the set of resources is allowed to be used by the at least one other wireless device. In some scenarios, the signaling used for configuring the set of resources may include at least one message transmitted before reserving the TXOP at step 1330, e.g., a message which is part of signaling for associating STAs to APs of the wireless communication system.

If the wireless device is an AP and cooperates with one or more other APs by sharing the reserved TXOP, as explained for step 1340, step 1350 may involve that the set of resources is configured based on signaling performed before configuration of the sharing of the reserved TXOP by the APs, e.g., based on the pre-configuration part 1210 of the signaling of FIG. 12. In addition or as alternative, the set of resources may be configured based on signaling used for configuration of the sharing of the reserved TXOP by the access points, e.g., based on one or more messages of the CAP TXOP sharing establishment part 1220 of the signaling of FIG. 12.

In some scenarios, the set of resources may be configured based on prediction of the data arriving after beginning of the TXOP, e.g., based on an expected traffic pattern. In addition or as an alternative, the set of resources may be configured based on pre-configured information stored in the wireless device, e.g., based on operator settings and/or manufacturer settings.

In some scenarios, access to the set of resources is contention based. Alternatively or in addition, usage of the set of resources by the at least one other wireless device may be based on spatial reuse of at least a part of the set of resources.

The set of resources may be defined in terms of one or more time slots within the TXOP and/or in terms of one or more parts of a bandwidth of the medium. In addition or as an alternative, the set of resources is defined in terms of spatial resources. The spatial resources may correspond to resources where spatial reuse by the at least one other wireless device is allowed.

At step 1360, the wireless device may reclaim at least a part of the set of resources. For example, the wireless device may reclaim at least a part of the set of resources in response to receiving an indication from the at least one other wireless device. The above-mentioned MR message in the example of FIG. 11A is an example of such indication. Alternatively or in addition, the wireless device may reclaim at least a part of the set of resources in response to detecting at least one transmission on the set of resources, e.g., like in the example of FIG. 11B. Alternatively or in addition, the wireless device may reclaim at least a part of the set of resources in response to not detecting transmissions on the set of resources, e.g., like in the example of FIG. 8A or 8B.

Figure 14:
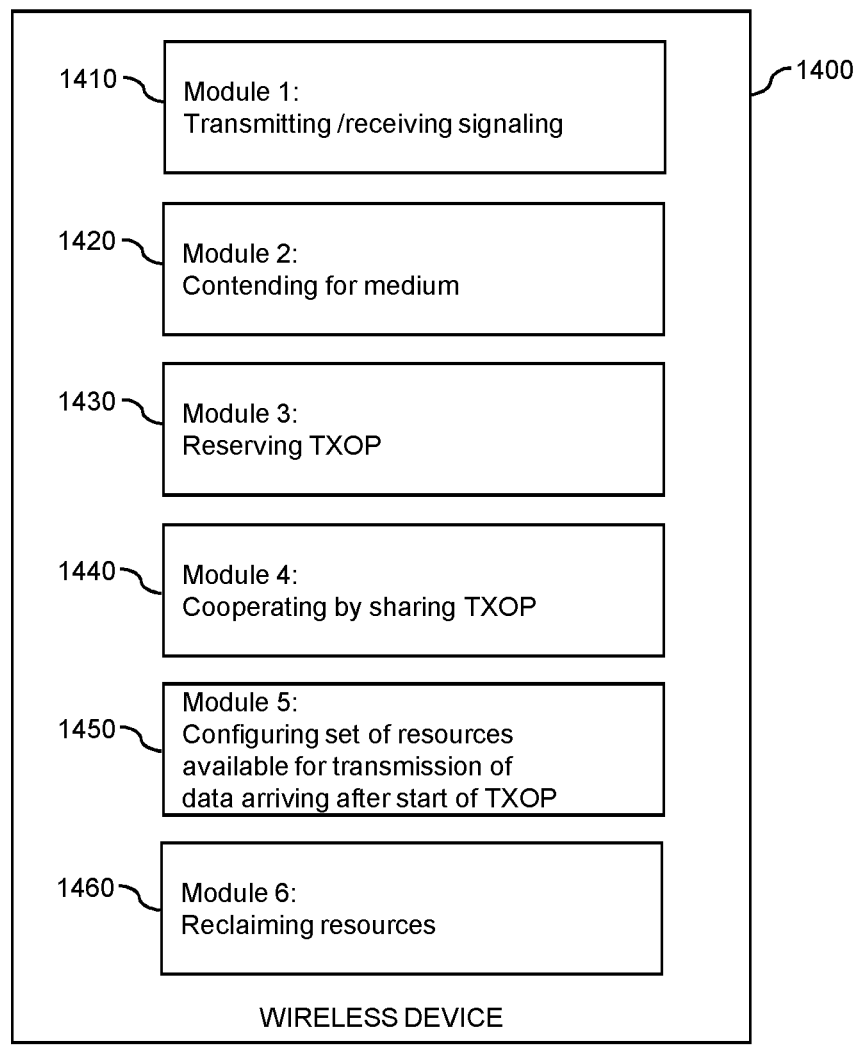
FIG. 14 shows a block diagram for schematically illustrating functionalities of a wireless device according to an embodiment.

FIG. 14 shows a block diagram for illustrating functionalities of a wireless device 1400 which operates according to the method of FIG. 13. The wireless device 1400 may for example correspond to one of above-mentioned APs 10 or to one of the above-mentioned STAs 11. As illustrated, the wireless device 1400 may be provided with a module 1410 configured to transmit and/or receive signaling, such as explained in connection with step 1310. Further, the wireless device 1400 may be provided with a module 1420 configured to contend for a medium, such as explained in connection with step 1420. Further, the wireless device 1400 may be provided with a module 1430 configured to reserve a TXOP on the medium, such as explained in connection with step 1430. Further, the wireless device 1400 may be provided with a module 1440 configured to cooperate with one or more other APs by sharing the TXOP, such as explained in connection with step 1440. Further, the wireless device 1400 may be provided with a module 1450 configured to configure a set of resources for transmission of data arriving after start of the TXOP, such as explained in connection with step 1350. Further, the wireless device 1400 may be provided with a module 1460 configured to reclaim resources, such as explained in connection with step 1360.

It is noted that the wireless device 1400 may include further modules for implementing other functionalities, such as known functionalities of a WLAN AP or non-AP STA. Further, it is noted that the modules of the wireless device 1400 do not necessarily represent a hardware structure of the wireless device 1400, but may also correspond to functional elements, e.g., implemented by hardware, software, or a combination thereof.

Figure 15:
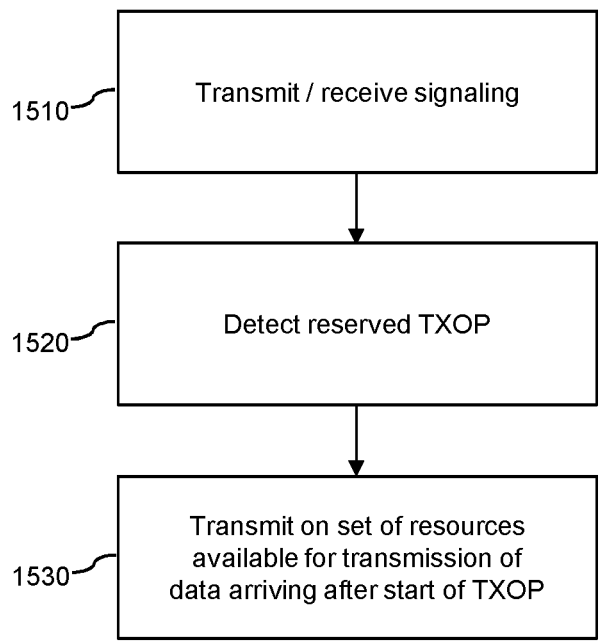
FIG. 15 shows a flowchart for schematically illustrating a further method according to an embodiment.

FIG. 15 shows a flowchart for illustrating a method, which may be utilized for implementing the illustrated concepts. The method of FIG. 15 may be used for implementing the illustrated concepts in a wireless device. The wireless device may be an AP of a wireless communication system, such as one or the above-mentioned APs 10. In some scenarios, the wireless device may be a wireless station, in particular a non-AP STA, such as one or the above-mentioned STAs 11. The wireless communication system may be based on a wireless local area network, WLAN, technology, e.g., according to the IEEE 802.11 standards family.

If a processor-based implementation of the wireless device is used, at least some of the steps of the method of FIG. 15 may be performed and/or controlled by one or more processors of the wireless device. Such wireless device may also include a memory storing program code for implementing at least some of the below described functionalities or steps of the method of FIG. 15.

At step 1510, the wireless device may transmit or receive signaling. For example, step 1510 may involve that the wireless device sends one or messages to another wireless device. In addition or as an alternative, step 1510 may involve that the wireless device receives one or messages from another wireless device. For example, one or more of the above-mentioned messages 601, 701, 702, 705 could be part of the signaling transmitted or received at step 1510. Further, the signaling of step 1510 could include at least a part of the above-mentioned pre-configuration part 1210 of signaling and/or one more messages of the above-mentioned CAP TXOP establishment signaling 1220, e.g., a CTI message and/or a CTR message.

In some scenarios, the signaling may involve negotiation between the wireless device and the other wireless device. In some scenarios, the signaling may involve that the wireless device receives a broadcast message, e.g., a beacon frame.

At step 1520, the wireless device detects a TXOP reserved by another wireless device on the medium. In some scenarios, the TXOP may be reserved by transmission the above-mentioned CTI message. In some scenarios, the TXOP may be shared by multiple cooperating APs, e.g., by using a CAP TXOP sharing process as explained in connection with FIG. 9, 10, 11A, 11B, or 12, and the other wireless device may be one of these APs.

At step 1530, the wireless device transmits data arriving after beginning of the TXOP. The wireless device transmits the data on a set of resources configured in the reserved TXOP. The set of resources may be configured based on signaling performed by the wireless device and/or the other wireless device, e.g., based on the signaling of step 1510. In some scenarios, the signaling may include a message received by the wireless device and the message may indicate the set of resources. Examples of such message are the above-mentioned broadcast message 601 or the above-mentioned response message 702. In some scenarios, the message may also indicate one or more criteria for under which the set of resources is allowed to be used by the wireless device. In some scenarios, the signaling used for configuring the set of resources may include at least one message transmitted before reservation of the TXOP, e.g., a message which is part of signaling for associating STAs to APs of the wireless communication system. If the other wireless device is an AP which cooperates with one or more other APs by sharing the reserved TXOP, the set of resources may be configured based on signaling performed before configuration of the sharing of the reserved TXOP by the access points, e.g., based on the pre-configuration part 1210 of the signaling of FIG. 12. Alternatively or in addition, the set of resources is configured based on signaling used for configuration of the sharing of the reserved TXOP by the APs, e.g., based on one or more messages of the CAP TXOP sharing establishment part 1220 of the signaling of FIG. 12.

In some scenarios, the set of resources may be configured based on prediction of the data arriving after beginning of the TXOP, e.g., based on an expected traffic pattern. In addition or as an alternative, the set of resources may be configured based on pre-configured information stored in the wireless device, e.g., based on operator settings and/or manufacturer settings.

In some scenarios, access to the set of resources is contention based. Alternatively or in addition, usage of the set of resources by the at least one other wireless device may be based on spatial reuse of at least a part of the set of resources.

The set of resources may be defined in terms of one or more time slots within the TXOP and/or in terms of one or more parts of a bandwidth of the medium. In addition or as an alternative, the set of resources is defined in terms of spatial resources. The spatial resources may correspond to resources where spatial reuse by the at least one other wireless device is allowed.

In some scenarios, the other wireless device may reclaim at least a part of the set of resources. For example, the wireless device may send an indication for causing the other wireless device to reclaim at least a part of the set of resources. The above-mentioned MR message in the example of FIG. 11A is an example of such indication. Alternatively or in addition, in response to performing at least one transmission on the set of resources, the wireless device may assume that the other wireless device reclaimed at least a part of the set of resources e.g., like in the example of FIG. 11B. Alternatively or in addition, in response to not transmitting on the set of resources, the wireless device may assume that the other wireless device reclaimed at least a part of the set of resources, e.g., like in the example of FIG. 8A or 8B.

Figure 16:
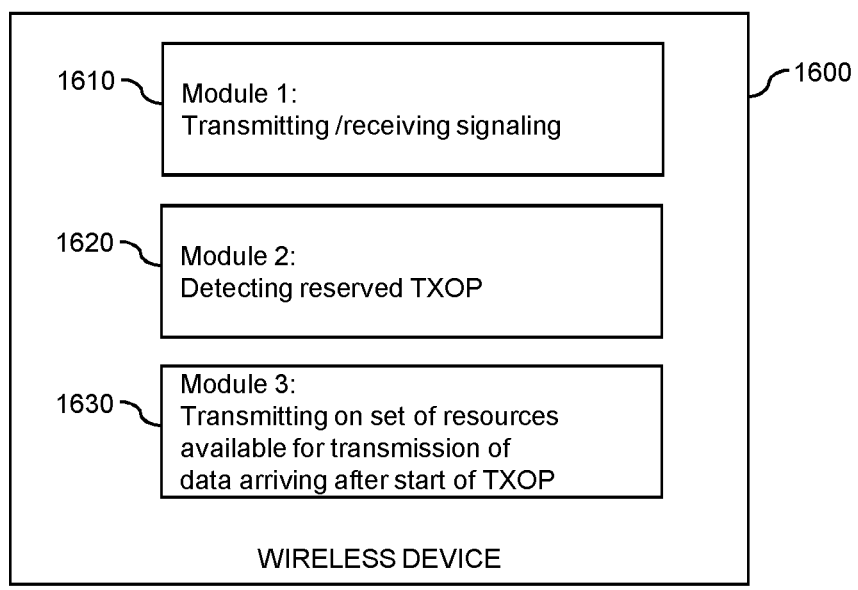
FIG. 16 shows a block diagram for schematically illustrating functionalities of a further wireless device according to an embodiment.

FIG. 16 shows a block diagram for illustrating functionalities of a wireless device 1600 which operates according to the method of FIG. 15. The wireless device 1600 may for example correspond to one of above-mentioned APs 10 or to one of the above-mentioned STAs 11. As illustrated, the wireless device 1600 may be provided with a module 1610 configured to transmit and/or receive signaling, such as explained in connection with step 1510. Further, the wireless device 1600 may be provided with a module 1620 configured to detect a reserved TXOP, such as explained in connection with step 1520. Further, the wireless device 1600 may be provided with a module 1630 configured to transmit on a set of resources configured to be available for transmission of data arriving after start of the TXOP, such as explained in connection with step 1530.

It is noted that the wireless device 1600 may include further modules for implementing other functionalities, such as known functionalities of a WLAN AP or non-AP STA. Further, it is noted that the modules of the wireless device 1600 do not necessarily represent a hardware structure of the wireless device 1600, but may also correspond to functional elements, e.g., implemented by hardware, software, or a combination thereof.

It is noted that the functionalities as described in connection with FIGS. 13 to 16 could also be implemented in a system, e.g., a system including a wireless device operating according to the method of FIG. 13 and one or more further wireless devices operating according to the method of FIG. 15. Further, the same wireless device could operate according to both the method of FIG. 13 and the method of FIG. 15, e.g., depending on whether the wireless device itself has gained a TXOP. In response to gaining a TXOP, the wireless device could operate according to the method of FIG. 13. If some other wireless device gained a TXOP, the wireless device could operate according to the method of FIG. 15.

Figure 17:
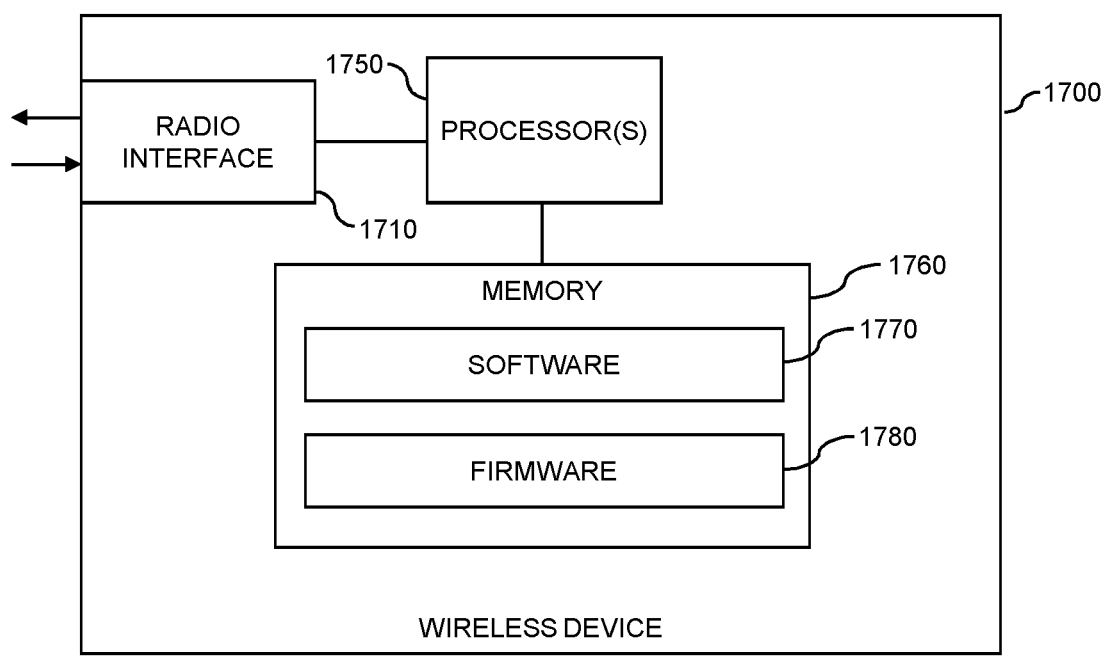
FIG. 17 schematically illustrates structures of a wireless device according to an embodiment.

FIG. 17 illustrates a processor-based implementation of a wireless device 1700. The structures as illustrated in FIG. 17 may be used for implementing the above-described concepts. The wireless device 1700 may for example correspond to one of above-mentioned APs 10 or to one of the above-mentioned STAs 11.

As illustrated, the wireless device 1700 includes one or more radio interfaces 1710. The radio interface(s) 1710 may for example be based on a WLAN technology, e.g., according to an IEEE 802.11 family standard. However, other wireless technologies could be supported as well, e.g., the LTE technology or the NR technology. In some scenarios, the radio interface(s) 1710 may be based on multiple antennas of the wireless device 1700 and support beamformed multi-antenna port transmission to enable spatial multiplexing of wireless transmissions.

Further, the wireless device 1700 may include one or more processors 1750 coupled to the radio interface(s) 1710 and a memory 1760 coupled to the processor(s) 1750. By way of example, the radio interface(s) 1710, the processor(s) 1750, and the memory 1760 could be coupled by one or more internal bus systems of the wireless device 1700. The memory 1760 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1760 may include software 1770 and/or firmware 1780. The memory 1760 may include suitably configured program code to be executed by the processor(s) 1750 so as to implement the above-described functionalities for controlling wireless transmissions, such as explained in connection with FIG. 13 or 15.

It is to be understood that the structures as illustrated in FIG. 17 are merely schematic and that the wireless device 1700 may actually include further components which, for the sake of clarity, have not been illustrated, e.g., further interfaces or further processors. Also, it is to be understood that the memory 1760 may include further program code for implementing known functionalities of a WLAN AP or non-AP STA. According to some embodiments, also a computer program may be provided for implementing functionalities of the wireless device 1700, e.g., in the form of a physical medium storing the program code and/or other data to be stored in the memory 1760 or by making the program code available for download or by streaming.

As can be seen, the concepts as described above may be used for efficiently enabling low-latency transmissions of critical data within a reserved TXOP. In particular, a channel access delay can be lowered in scenarios where multiple wireless devices coexist and contend for the same resources on a medium. The lowered channel access delay can be particularly beneficial for services having strict requirements with respect to latency or reliability, e.g., for applications related to factory deployments, to emergency services, to public safety services, or to V2V communication.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and STAs. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless transmissions in a wireless communication system, the method performed by a wireless device, the method comprising:
contending, by the wireless device, for access to a medium;
in response to gaining access to the medium, reserving, by the wireless device, a transmission opportunity (TXOP) on the medium; and
based on signaling performed by the wireless device, configuring a set of resources in the reserved TXOP to be available to at least one other wireless device for one or more transmissions of data arriving after a beginning of the TXOP, wherein the signaling comprises a message transmitted by the wireless device, which indicates the set of resources and one or more criteria under which the set of resources is allowed to be used by the at least one other wireless device, wherein the wireless device is an access point, wherein said configuring is performed as part of cooperating with one or more other access points by sharing the reserved TXOP.

2. The method according to claim 1, wherein the signaling comprises at least one of:
negotiation between the wireless device and the at least one other wireless device; or
a broadcast message transmitted by the wireless device.

3. The method according to claim 1, wherein the signaling comprises at least one message transmitted before reserving the TXOP.

4. The method according to claim 1, further comprising transmitting the signaling.

5. The method according to claim 1, wherein the set of resources is configured based on:
signaling performed before configuration of the sharing of the reserved TXOP by the access points; or
signaling used for configuration of the sharing of the reserved TXOP by the access points; or
prediction of the data arriving after beginning of the TXOP.

6. The method according to claim 1, further comprising reclaiming, by the wireless device, at least a part of the set of resources, in response to:
receiving an indication from the at least one other wireless device,
detecting at least one transmission on the set of resources; or
not detecting transmissions on the set of resources.

7. The method of claim 1, wherein the at least one other wireless device is at least one other access point with which the reserved TXOP is shared, and wherein said configuring comprises configuring the set of resources in the reserved TXOP to be available to the at least one other wireless device for one or more transmissions of data from the at least one other wireless device that arrive, at a physical layer entity of the at least one other wireless device or at a transmit buffer of the at least one other wireless device, after a beginning of the TXOP.

8. A method of controlling wireless transmissions in a wireless communication system, the method performed by a wireless device, the method comprising:
detecting, by the wireless device, reservation of a transmission opportunity (TXOP) by another wireless device; and
on a set of resources in the reserved TXOP, transmitting, by the wireless device, data arriving after a beginning of the TXOP;
wherein the set of resources is configured based on signaling performed by the other wireless device, wherein the signaling comprises a message transmitted by the other wireless device, which indicates the set of resources and one or more criteria under which the set of resources is allowed to be used by the wireless device, wherein the other wireless device is an access point which cooperates with one or more other access points by sharing the reserved TXOP.

9. The method according to claim 8, wherein the signaling comprises:
negotiation between the wireless device and the other wireless device; or
a broadcast message transmitted by the other wireless device.

10. The method according to claim 8, wherein the signaling comprises at least one message transmitted before reserving the TXOP.

11. The method according to claim 8, further comprising receiving the signaling.

12. The method according to claim 8, wherein the set of resources is configured based on signaling performed before configuration of the sharing of the reserved TXOP by the access points.

13. The method according to claim 8, wherein the set of resources is configured based on:
signaling used for configuration of the sharing of the reserved TXOP by the access points; or
prediction of the data arriving after beginning of the TXOP.

14. The method according to claim 8, further comprising sending an indication for causing the other wireless device to reclaim at least a part of the set of resources.

15. The method according to claim 8, wherein said transmitting comprises transmitting data on a first part of the set of resources, and wherein the method further comprises, based on not transmitting data on a second part of the set of resources, determining, or operating on an assumption that, the other wireless device has reclaimed at least the second part of the set of resources.

16. The method of claim 8, wherein the wireless device is an access point with which the reserved TXOP is shared, and wherein said transmitting comprises transmitting, on the set of resources in the reserved TXOP, data that arrives, at a physical layer entity of the wireless device or at a transmit buffer of the wireless device, after a beginning of the TXOP.

17. A wireless device for a wireless communication system, the wireless device comprising:
at least one processor, and
a memory containing program code executable by the at least one processor, whereby execution of the program code by the at least one processor causes the wireless device to:
contend for access to a medium;
in response to gaining access to the medium, reserve a transmission opportunity (TXOP) on the medium; and
based on signaling performed by the wireless device, configure a set of resources in the reserved TXOP to be available to at least one other wireless device for one or more transmissions of data arriving after a beginning of the TXOP, wherein the signaling comprises a message transmitted by the wireless device, which indicates the set of resources and one or more criteria under which the set of resources is allowed to be used by the at least one other wireless device, wherein the wireless device is an access point, wherein execution of the program code by the at least one processor causes the wireless device to perform said configuring as part of cooperating with one or more other access points by sharing the reserved TXOP.

18. The wireless device of claim 17, wherein execution of the program code by the at least one processor further causes the wireless device to transmit the signaling.

19. The wireless device of claim 17, wherein the at least one other wireless device is at least one other access point with which the reserved TXOP is shared, and wherein execution of the program code by the at least one processor causes the wireless device to configure the set of resources in the reserved TXOP to be available to the at least one other wireless device for one or more transmissions of data from the at least one other wireless device that arrive, at a physical layer entity of the at least one other wireless device or at a transmit buffer of the at least one other wireless device, after a beginning of the TXOP.

20. A wireless device for a wireless communication system, the wireless device comprising:
at least one processor, and
a memory containing program code executable by the at least one processor,
whereby execution of the program code by the at least one processor causes the wireless device to:
detect reservation of a transmission opportunity (TXOP) by another wireless device; and
on a set of resources in the reserved TXOP, transmit data arriving after a beginning of the TXOP;
wherein the set of resources is configured based on signaling performed by the other wireless device, wherein the signaling comprises a message transmitted by the other wireless device, which indicates the set of resources and one or more criteria under which the set of resources is allowed to be used by the wireless device, wherein the other wireless device is an access point which cooperates with one or more other access points by sharing the reserved TXOP.

* * * * *